(12) United States Patent
Yatake et al.

(10) Patent No.: US 6,767,090 B2
(45) Date of Patent: Jul. 27, 2004

(54) INK SET FOR INK-JET RECORDING

(75) Inventors: Masahiro Yatake, Nagano-ken (JP); Toshiyuki Miyabayashi, Nagano-ken (JP); Hiroko Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/048,908

(22) PCT Filed: Jun. 6, 2001

(86) PCT No.: PCT/JP01/04788

§ 371 (c)(1),
(2), (4) Date: Feb. 4, 2002

(87) PCT Pub. No.: WO01/94482

PCT Pub. Date: Dec. 13, 2001

(65) Prior Publication Data

US 2003/0097961 A1 May 29, 2003

(30) Foreign Application Priority Data

Jun. 7, 2000 (JP) .................................. 2000-170930
Jun. 7, 2000 (JP) .................................. 2000-170933

(51) Int. Cl.⁷ ................................................. B41J 2/01
(52) U.S. Cl. ........................ 347/100; 347/101; 347/95
(58) Field of Search ................................ 347/100, 101, 347/95, 96; 106/31.13, 31.6, 31.27, 31.36

(56) References Cited

U.S. PATENT DOCUMENTS

| | | | | |
|---|---|---|---|---|
| 5,328,504 A | * | 7/1994 | Ohnishi | 347/100 |
| 5,364,461 A | * | 11/1994 | Beach et al. | 347/100 |
| 5,431,720 A | * | 7/1995 | Nagai et al. | 347/100 |
| 5,640,187 A | * | 6/1997 | Kashiwazaki et al. | 347/101 |
| 5,658,376 A | * | 8/1997 | Noguchi et al. | 347/100 |
| 5,769,930 A | * | 6/1998 | Sano et al. | 347/100 |
| 5,846,306 A | * | 12/1998 | Kubota et al. | 347/100 |
| 5,985,015 A | * | 11/1999 | Kanaya | 106/31.6 |
| 6,399,674 B1 | * | 6/2002 | Kashiwazaki et al. | 347/100 |
| 6,465,567 B1 | * | 10/2002 | Grobe et al. | 524/611 |

FOREIGN PATENT DOCUMENTS

| | | | | |
|---|---|---|---|---|
| EP | 0879857 A2 | * | 5/1998 | |
| EP | 0879857 A2 | * | 11/1998 | .............. B41J/2/01 |
| JP | 6295366 | | 5/1987 | |
| JP | 1170672 | | 7/1989 | |
| JP | 2127482 | | 5/1990 | |
| JP | 539447 | | 2/1993 | |
| JP | 5330516 | | 12/1993 | |
| JP | 657654 | | 3/1994 | |
| JP | 6313141 | | 11/1994 | |
| JP | 794634 | | 10/1995 | |
| JP | 830228 | | 2/1996 | |
| JP | 859715 | | 3/1996 | |
| JP | 881647 | | 3/1996 | |
| JP | 8302227 | | 11/1996 | |
| JP | 9279053 | | 10/1997 | |
| JP | 1077430 | | 3/1998 | |
| JP | 10120957 | | 5/1998 | |
| JP | 10140065 | | 5/1998 | |
| JP | 10176130 | | 6/1998 | |
| JP | 10315445 | | 12/1998 | |
| JP | 10316909 | | 12/1998 | |
| JP | 20007961 | | 1/2000 | |
| JP | 20007964 | | 1/2000 | |
| JP | 2000-007961 | * | 1/2000 | ........... C09D/11/00 |
| JP | 186244 | | 7/2000 | |
| JP | 123098 | | 5/2001 | |

* cited by examiner

Primary Examiner—Stephen D. Meier
Assistant Examiner—Manish Shah
(74) Attorney, Agent, or Firm—Ladas & Parry

(57) ABSTRACT

An ink jet recording ink set including a plurality of inks, each ink including at least a colorant encapsulating a pigment with a polymer, a penetrating agent and water, wherein the ink set includes a combination of black, yellow, magenta and cyan inks, and wherein the polymer in each of the black, yellow, magenta and cyan inks is a polymer of a polymerizable surface active agent and a monomer, which gives high color density printed image, satisfactory color reproducibility, excellent ejection stability and storage stability.

29 Claims, No Drawings

INK SET FOR INK-JET RECORDING

TECHNICAL FIELD

The present invention relates to an ink set for use in an ink jet recording method and specifically to an ink set for ink jet recording which can produce high-quality printed images on recording media such as ink jet recording exclusive papers, etc., for example, plain papers, coated papers, glazed papers, etc., and which is excellent in the storage stability. More particularly, the invention relates to (1) an ink jet recording ink set, wherein each ink comprises at least a colorant enclosing a pigment and/or a dye with a polymer, and the ink set comprises a combination of black, yellow, magenta and cyan, or a combination further combined with orange and green, and relates to (2) an ink jet recording ink set, wherein each ink comprises at least a colorant enclosing a pigment and/or a dye with a polymer, and the ink set comprises a combination of black ink, yellow ink, magenta ink and cyan ink, each ink comprising at least one kind of ink having a different concentration.

BACKGROUND ART

Ink jet recording is a method of recording letters or figures on the surface of a recording medium by ejecting an ink from a fine nozzle as droplets. As an ink jet recording system, a method wherein electric signals are converted to mechanical signals using an electrostrictive element and an ink reserved in a nozzle head section is intermittently ejected to record letters or symbols on the surface of a recording medium; and a method wherein a part of an ink reserved in a nozzle head section and very closing to the ejecting portion is rapidly heated to generate bubbles, whereby the ink is intermittently ejected by the volume expansion caused by the bubbles to record letters or symbols on the surface of a recording medium, etc., have been practically used.

The inks used for such an ink jet recording have been required to have various characteristics. For example, the characteristics such as (a) the ink does not cause bleeding upon printing on paper, which is a recording medium, (b) the ink has a good drying property, (c) the ink can be uniformly printed on the surfaces of various recording media, (d) in multi-color printing, e.g., color printing, etc., adjacent colors are not mingled, (e) the keeping quality of color images is good, etc., have been required.

For the required characteristics such as the above-described (a) to (e), dye inks and pigment inks have been investigated as inks. Since the inks using dyes are excellent in the color developing property but are inferior in the light resistance and the water resistance, pigment inks have, recently, been investigated.

In many inks using pigments, it has been investigated to restrain wetting of the surface of paper with ink by mainly restraining the permeability of ink and to ensure the printing quality by staying the ink droplets near the surface of paper, and such a technique has been put into practical use.

However, with the ink that restrains wetting to paper, there are problems that the difference in the degree of bleeding depending on the kind of paper is large and, upon printing of a multi-color system such as a color printing, adjacent colors are intermingled and further there is a problem that the scrubbing resistance becomes inferior.

For solving these problems, it has been attempted to add a penetrating agent for improving the permeability of ink to paper. For example, examples of using glycol ethers are disclosed. Specifically, Japanese Patent Laid-Open No. 147861/1981 discloses an example of using triethylene glycol monomethyl ether, and Japanese Patent Laid-Open No. 111165/1997, examples of using an ether such as ethylene glycol, diethylene glycol or triethylene glycol are disclosed. Also, U.S. Pat. No. 5,156,675 proposes the addition of diethylene glycol monobutyl ether, U.S. Pat. No. 5,183,502 proposes the addition of Surfynol 465 (manufactured by Air Products and Chemicals Inc.), which is an acetylene glycol-based surface active agent, and U.S. Pat. No. 5,196,056 proposes the use of diethylene glycol monobutyl ether and Surfynol 465 together. Moreover, U.S. Pat. No. 2,083,372 proposes to use ethers of diethylene glycol for inks.

Also, in the inks using conventional pigments, it has generally been carried out to disperse the pigment in an aqueous medium using a dispersing agent such as a surface active agent, a polymeric dispersing agent, etc. However, there is a problem that it is not easy to improve "the permeability of the ink" while ensuring the dispersion stability of the pigment.

Also, in the pigment ink wherein "a pigment dispersion having a dispersed pigment" is prepared using a dispersing agent such as a surface active agent, a polymeric dispersing agent, etc., and the permeability thereof is improved by using the pigment dispersion, since the dispersing agent is simply adsorbed to the surface of the pigment, it sometimes happens that when a strong shearing force is applied in the case of ejecting the ink through a fine nozzle, the dispersing agent adsorbed is released to reduce the dispersibility, whereby "a tendency that the ejection becomes unstable" occurs. Also, in the case of storing the pigment ink for a long period of time, the tendency that the ejection becomes unstable sometimes happens.

As the means for solving these problems, a method of increasing the addition amount of the dispersing agent may be considered but in this case, since the amount of the dispersing agent, which is dissolved in the ink without being adsorbed to the surfaces of the pigments, in the case of printing on a plain paper or a recycled paper using the ink, the phenomena that bleeding is liable to occur, the periphery of a nozzle is wetted with the ink and the ejection is liable to become unstable, etc., tend to occur.

Furthermore, in the case of printing on a plain paper, a recycled paper, etc., with the above-described pigment ink (the pigment ink wherein "a pigment dispersion having a dispersed pigment" is prepared using a dispersing agent such as a surface active agent, a polymeric dispersing agent, etc., and the permeability thereof is improved by using the pigment dispersion), there is a tendency that the pigment which is a coloring component is hard to remain on the surfaces of the paper fibers of the surface of the recording medium, whereby there are tendencies that a good printed density is not obtained and the color development is not good. Also, since there is a tendency of increasing the viscosity of the ink by the dispersing agent dissolved in the liquid without being adsorbed on the surface of the pigment from the initial stage and the dispersing agent released from the pigments, the content of the pigment is frequently limited, thereby particularly with a plain paper and a recycled paper, a sufficient printed density cannot be obtained. Accordingly, good color development cannot be obtained and it is difficult to obtain printed images of a high quality. Furthermore, when the ink is stored for a long period of time in the state of filling in a nozzle head, it sometime happens that the dispersion stability is deteriorated and the ink is hard to be ejected from the nozzle of the printer.

On the other hand, as the means of attaining the purposes of enhancing the ejection stability, the dispersion stability, the printing density, the color developing property, etc., an ink using a pigment wherein the surface is subjected to some treatment has been proposed.

As the ink using the pigment subjected to some treatment, there are proposed, for example, "the ink having pigment particles surfaces of which are subjected to an oxidation treatment" described in Japanese Patent Laid-Open No. 319444/1996, "the ink having the encapsulated fine pigment particles" described in Japanese Patent Publication No. 94634/1995 and Japanese Patent Laid-Open No. 59715/1996, and "the ink having the pigment particles surfaces of which are graft polymerized with a polymer" described in Japanese Patent Laid-Open Nos. 339516/1993, 302227/1996, 302228/1996 and 81647/1996, but the above-described purposes have not yet been sufficiently attained. Also, in Japanese Patent Laid-Open No. 320276/1993, "a method of microencapsulating a hydrophobic powder using an amphiphilic graft polymer" is proposed, but when a previously polymerized polymer is used at the microencapsulation, there is a problem that the particle sizes after the encapsulation becomes too large.

In addition to the above-described propositions, in Japanese Patent Laid-Open Nos. 218015/1996, 295837/1996, 3376/1997, 183920/1996, 46075/1998, 292143/1998, 80633/1999, 349870/1999 and 7961/2000, "ink using a pigment coated with a resin having a film-forming property at room temperature by a phase inversion emulsification method" is proposed, and in Japanese Patent Laid-Open Nos. 31360/1997, 217019/1997, 316353/1997, 104834/1997, 151342/1997, 140065/1998, 152424/1999, 166145/1999, 199783/1999 and 209672/1999, "ink using a pigment coated with an anionic group-containing polymer compound by an acid deposition method" is proposed.

Moreover, in Japanese Patent Laid-Open Nos. 286939/1997, 44852/2000, 53897/2000, 53898/2000, 53899/2000 and 53900/2000, "ink using a polymer emulsion wherein polymer fine particles are impregnated with a coloring material by a phase conversion emulsification method" is proposed.

However, in "the colorants obtained by the phase conversion emulsification method or the acid deposition method" described above and "the inks using glycol ethers or the surface active agents such as acetylene glycol-based surface active agents, etc. as penetrating agents" described above, the pigment, which is a coloring component, is hard to remain on the surfaces of the paper fibers of the surface of the recording medium in the case of printing on a plain paper or a recycled paper. This is, for example, because "the resin, which was not adsorbed on the pigment, exists dissolved in the ink", or because "the resin adsorbed on the pigment is released to increase the amount of the resin dissolved in the ink". Therefore, a high printing density is hard to obtain and the color development is bad. Also, the phenomena that bleeding is liable to occur, that the periphery of a nozzle is wetted with the ink and that the ejection is liable to become unstable, etc., are liable to occur. Thus, particularly, the image quality in printing on a plain paper or a recycled paper is not yet satisfactory.

Also, it is known that according to the kind of a coloring material and the permeability of ink, the color reproducing range largely differs, and the dispersion stability of the pigment, particularly, the dispersion stability by allowing to stand for a long period of time is inferior, and also there are large problems that the head is clogged with pigments.

As described above, when a pigment is used as a colorant of an ink, since the surface property of the pigment differs in each kind of the pigment, a dispersing method suitable for each pigment must be selected for the purpose of obtaining the dispersion stability, by appropriately changing the kind and the addition amount of a dispersing agent added. By such a construction of the dispersion, the following problems (1) and (2) occur.

(1) Even when a pigment giving a proper color reproducing range and high chroma is selected as a colorant of ink, the properties of the ink prepared therewith do not fall within the preferred range for ink jet, and after all, there occurs a problem that one cannot take advantage of the capability essential to the combination of pigments.

(2) In an ink jet recording ink, the prevention of color bleeding is frequently attained by imparting a permeability to paper but additives to ink for imparting a permeability to paper frequently cause the problems that a dispersing agent adsorbed to a pigment is desorbed to cause aggregates and changes in the properties of the ink, etc.

DISCLOSURE OF THE INVENTION

The present inventors have obtained a knowledge (hereinafter, is referred to as "the 1st knowledge") that in an ink jet recording ink set using pigments for the colorants of inks, good color images can be realized by a combination of the specific pigments. Furthermore, it has been confirmed that enclosing each of the pigments with a polymer to form each colorant can solve the above-described problems.

Also, the inventors have further obtained a knowledge (hereinafter, is referred to as "the 2nd knowledge") that in an ink jet recording ink set using pigments for the colorants of inks, good color images can be realized by a specific combination of the pigments and by using at least one kind ink having a different addition concentration, for each of "black inks, yellow inks, magenta inks and cyan inks". Furthermore, it has been confirmed that by enclosing each of the pigments with a polymer to form each colorant, the above-described problems such as the fixing property in the exclusive paper, the difference in the glossy feeling (glossy unevenness), etc., can be solved.

The present inventions are based on the above-described 1st and 2nd knowledges.

A 1st object of the invention is to provide an ink jet recording ink set, wherein the concentrations of the pigments can be optimized, the design of the pigment inks can be very easily carried out, a desired intermediate color can be colored, and good color images can be realized.

A 2nd object of the invention is to provide an ink jet recording ink set excellent in the dispersion stability of ink.

As the technical construction for attaining the above-described objects, the present invention has a feature that it provides "an ink jet recording ink set, wherein each ink comprises at least a colorant enclosing a pigment and/or a dye with a polymer, a penetrating agent and water, and the ink set comprising a combination of black, yellow, magenta and cyan." Also, the invention has a feature that the ink set comprises a combination further including orange and green in addition to the above-described 4 colors (black, yellow, magenta and cyan).

Furthermore, as the technical construction of attaining the above-described objects, the invention has a feature that the above described "black, yellow, magenta and cyan" comprises:

a combination of at least one kind of a black ink, at least one kind of a yellow ink, at least one kind of a magenta ink, and at least one kind of a cyan ink; or a combination of at least one kind of a black ink having a different addition concentration, at least one kind of a yellow ink having a different addition concentration, at least one kind of a magenta ink having a different addition concentration, and at least one kind of a cyan ink having a different addition concentration.

Also, the invention has a feature that the pigment used for the above-described black colorant is C.I. Pigment Black 7, the pigment used for the above-described yellow colorant is one kind or two or more kinds of the pigments selected from C.I. Pigment Yellow 55, 74, 110, 128, 150, 155 and 180, the pigment used for the above-described magenta colorant is one kind or two or more kinds of the pigments selected from C.I. Pigment Red 122, 202 and 209, and the pigment used for the above-described cyan colorant is one kind or two or more kinds of the pigments selected from C.I. Pigment Blue 15, 15:1, 15:2, 15:3, 15:4, 15:6 and 16.

Also, the invention has a feature that the pigment used for the above-described orange colorant is one kind or two or more kinds of the pigments selected from C.I. Pigment Oranges 36 and 43 and the pigment used for the above-described green colorant is one kind or two or more kinds of the pigments selected from C.I. Pigment Greens 7 and 36.

As described above, in the ink jet recording ink set of the invention, by employing a colorant enclosing the specific pigments with a polymer for each ink and by combining specific 4 colors pigments of black, yellow, magenta and cyan, and further, by adding thereto specific pigments of orange and green, the invention provides an ink jet recording ink set, wherein the concentrations of the pigments can be optimized, the design of the pigment inks can be very easily carried out, a desired intermediate color can be colored, and good color images can be realized. Furthermore, in the invention, "the dispersion stability of ink" can be more improved by enclosing each pigment with a polymer.

In an ink jet recording method, color images are expressed by applying the two-state control of "print/not print" to color ink composition(s). Accordingly, the number of colors capable of being expressed is limited by the relation with the resolution, but in the invention, particularly, by adding orange and green, the remarkable working-effect that the number of colors capable of being expressed is greatly increased.

Furthermore, in the ink set of the invention, by using pigments for the colorants, the working effects as described below are obtained. That is, an ink using a pigment for the colorant has a low transparency as compared with an ink using a dye as the colorant. Accordingly, when ink compositions of at least two colors are simultaneously printed, there are the tendencies that the lightness of the printed surface is lowered and the chroma is also lowered. The tendencies become remarkable when the attaching amount of the ink per unit area is increased, for example, when red or green is printed.

In the invention, particularly, by using the orange pigment and the green pigment, the attached amount of the ink upon printing a red color or a green color can be lowered, whereby a print having a high lightness and high chroma can be obtained. This phenomenon is also confirmed in the case of a dye ink, but the effect is larger in the case of the pigment ink wherein the transparency of the ink composition is low. Also, the effects usually obtained in the case of using pigments as colorants, that is, the high water resistance and the high weather resistance can be simultaneously realized.

Also, as described above, in the ink jet recording ink set of the invention, each ink contain at least the colorant enclosing the pigment with a polymer, and the ink set comprises a combination of the specific pigment of 4 colors of at least one kind of a black ink having a different addition concentration, at least one kind of a yellow ink having a different addition concentration, at least one kind of a magenta ink having a different addition concentration, and at least one kind of a cyan ink having a different addition concentration, thereby the working effects that the concentrations of the pigments can be optimized, the design of the pigment inks can be very easily carried out, a desired intermediate color can be colored, and good color images can be realized are obtained.

Furthermore, by enclosing each pigment with a polymer, the fixing property of ink and the deterioration of images by the difference in glossy feeling are improved, and "the dispersion stability of ink" can be made further excellent. Also, the effects usually obtained in the case of using a pigment as a colorant, that is, the high water resistance and the high weather resistance can be simultaneously realized.

Also, the ink jet recording ink set of the invention has a feature that the addition amount of each of the above-described "colorants each enclosing the pigment and/or the dye with a polymer" is from 0.5 to 30% by weight.

Furthermore, the invention has features that "the polymer enclosing the pigment and/or the dye" described above comprises, as a main component, a polymer selected from the group consisting of a polyacrylic acid ester, a styrene-acrylic acid ester copolymer, polystyrene, a polyester, a polyamide, a polyimide, a silicon-containing polymer, and a sulfur-containing polymer and that the polymer is a polymer of a polymerizable surface active agent and a monomer.

Also, the invention has features that the above-described polymerizable surface active agent has a polymerizable group, a hydrophobic group, and a hydrophilic group in its structure; that the polymerizable group is selected from the group consisting of a vinyl group, an acrylic group, an acryloyl group, and a methacryloyl group; and that the hydrophilic group is selected from the group consisting of a carbonyl group, a carboxyl group, a hydroxyl group, a sulfonic acid group, and salts thereof.

Furthermore, the invention has features that "the polymer enclosing the pigment and/or the dye" described above is a polymer having a crosslinked structure, and that the polymer having a crosslinked structure described above is a polymer of a dispersing agent having a polymerizable group and a crosslinkable monomer. Also, the invention has a feature that the colorant enclosing the pigment and/or the dye with the polymer having the crosslinked structure is obtained by, after dispersing the pigment and/or the dye in water with the dispersing agent having a polymerizable group, adding thereto at least the crosslinkable monomer and a polymerization initiator to cause polymerization.

Also, the invention has a feature that each ink of the ink jet recording ink set further contains a material, which makes the surface tension 40 mN/m or lower, and glycerol. And the invention has a further feature that the material of making the surface tension 40 mN/m or lower is:

a substance comprising at least one member selected from acetylene glycol-based surface active agents, acetylene alcohol-based surface active agents, glycol ethers and 1,2-alkylene glycols; or a substance comprising at least one member selected from acetylene glycol-based surface active agents and/or acetylene alcohol-based surface active agents and at least one member selected from glycol ethers and/or 1,2-alkylene glycols.

Also, the invention has features that the above-described "acetylene glycol-based surface active agents and acetylene alcohol-based surface active agents" are 2,4-dimethyl-5-hexyne-3-ol, 2,4,7,9-tetramethyl-5-decyne-4,7-diol and 3,6-dimethyl-4-octyne-3,6-diol and/or said 2,4-dimethyl-5-hexyne-3-ol, 2,4,7,9-tetramethyl-5-decyne-4,7-diol and 3,6-dimethyl-4-octyne-3,6-diol, having added with at most 30, on average, ethyleneoxy groups and/or propyleneoxy groups; that the above-described glycol ethers are one kind or a mixture of two or more kinds selected from diethylene glycol mono(alkyl having from 4 to 8 carbon atoms) ethers, triethylene glycol mono(alkyl having from 4 to 8 carbon atoms) ethers, propylene glycol mono(alkyl having from 3 to 6 carbon atoms) ethers, and dipropylene glycol mono(alkyl having from 3 to 6 carbon atoms) ethers; that the above-described 1,2-alkylene glycols are 1,2-(alkyl having from 4 to 10 carbon atoms)diols, specifically, 1,2-pentanediol and/or 1,2-hexanediol; and that the above-described "propylene glycol mono(alkyl having from 3 to 6 carbon atoms) ethers and dipropylene glycol mono(alkyl having from 3 to 6 carbon atoms) ethers are propylene glycol monobutyl ethers and/or dipropylene glycol monobutyl ethers.

BEST MODE FOR CARRYING OUT THE INVENTION

As described above, the ink jet recording ink set of the invention has a feature that "in an ink jet recording ink set, wherein each ink comprises at least a colorant enclosing a pigment and/or a dye with the polymer, the ink set comprises a combination of black, yellow, magenta and cyan (and further, orange and green)" and also has a feature that the above-described "black, yellow, magenta, and cyan" comprise a combination of each at least one kind of black inks, yellow inks, magenta inks, and cyan inks each having a different addition concentration".

In the invention, the addition amount of the colorant is preferably from 0.5 to 30% by weight, and more preferably from 1.0 to 12% by weight. When the addition amount is less than 0.5% by weight, a proper printing density is hard to be ensured and when the addition amount exceeds 30% by weight, the viscosity of the ink is increased and a structural viscosity occurs in the viscosity characteristics, whereby the ejection stability tends to become inferior.

(Pigment)

The pigments used for the colorants in the invention are illustrated as follows.

As inorganic pigments for black, there are carbon blacks (C.I. Pigment Black 7) such as furnace black, lamp black, acetylene black, channel black, etc., and iron oxide pigments. Also, as organic pigments for black, there are black organic pigments such as aniline black (C.I. Pigment black 1), etc. In these pigments, "C.I. Pigment black 7" is preferred.

The pigments for yellow include C.I. Pigment 1 (Hansa Yellow), 3 (Hansa Yellow 10G), 12, 13, 14, 17, 24 (Flavanthrone Yellow), 34, 35, 37, 53, 55, 65, 73, 74, 81, 83, 93, 94, 95, 97, 98, 99, 108 (Anthrapyrimidine Yellow), 109, 110, 113, 117 (copper complex salt pigment), 120, 128, 133 (quinophthalone), 138, 139 (isoindolinone), 147, 150, 151, 153 (nickel complex salt pigment), 154, 155, 156, 167, 172, 180, etc. In these pigments, "C.I. Pigment Yellow 55, 74, 93, 109, 110, 128, 150, 155, 156, and 180" are preferred, and more preferred pigments are one or two more kinds of pigments selected from "C.I. Pigment yellow 55, 74, 110, 128, 150, 155, and 180".

The pigments for magenta include C.I. Pigment Red 1 (Para Red), 2, 3 (Toluidine Red), 5 (ITR Red), 7, 9, 10, 11, 12, 17, 30, 31, 38 (Pyrazolone Red), 42, 88 (thioindigo), 112 (naphthol AS series), 114 (naphthol AS-series), 122 (dimethylquinacridone), 123, 144, 149, 150, 166, 168 (anthoanthorone orange), 170 (naphthol As-series), 171, 175, 176, 177, 178, 179 (perylene maroon), 185, 187, 202, 209 (dichloroquinacridone), 219, 224 (perylene series), and 245 (naphthol AS series); and C.I. Pigment Violet 19 (quinacridone), 23 (Dioxazine Violet), 32, 33, 36, 38, 43, 50, etc. In these pigments, "C.I. Pigment Violet 19, C.I. Pigment Red 122, 202, and 209" are preferred, and more preferred pigments are one or two more kinds of pigments selected from "C.I. Pigment Red 122, 202, and 209".

The pigments for cyan include C.I. Pigment Blue 15, 15:1, 15:2, 15:3, 15:4, 15:6, 16 (nonmetallic phthalocyanine), 18 (alkali blue toner), 25, 60 (Threne Blue), 65 (violanthrone), 66 (Indigo), etc. In these pigments, the use of one kind or two or more kinds of the pigments selected from "C.I. Pigment Blue 15, 15:1, 15:2, 15:3, 15:4, 15:6, and 16" is preferred.

The pigments for orange include C.I. Pigment Orange 1, 2, 5, 7, 13, 14, 15, 16, 34, 36, 38, 43, etc., and in these pigments, the use of one or two or more kinds of the pigments selected from "C.I. Pigment Orange 36 and 43" is preferred.

The pigments for green include C.I. Pigment Green 7(Phthalocyanine Green), 10(Green Gold), 36, 37, etc., and in these pigments, the use of one or two or more kinds of the pigments selected from "C.I. Pigment Green 7 and 36" is preferred.

The particle sizes of the above-described pigments are preferably not larger than 1 $\mu$m, and more preferably from 0.01 to 0.15 $\mu$m.

(Dye)

As the dyes used for the colorants in the invention, dyes insoluble or sparingly soluble in water are preferred, and practically, there are, for example, oil-soluble dyes, basic dyes, disperse dyes, vat dyes, sulfur dyes, organic solvent-soluble dyes, reactive dyes, etc.

(Polymer Having or Not Having Crosslinked Structure)

The present invention has a feature that the polymer enclosing the pigment and/or the dye comprises, as a main component, a member selected from the group consisting of a polyacrylic acid ester, a styrene-acrylic acid ester copolymer, polystyrene, polyester, a polyamide, a polyimide, a silicon-containing polymer and a sulfur-containing polymer, and further has a feature that the polymer is a polymer of a polymerizable surface active agent and a monomer.

The colorant enclosing a coloring material with the polymer (a polymer having a crosslinked structure) for use in the invention can be obtained by enclosing a coloring material using a polymer having a polymerizable group (crosslinking reactive group), a hydrophobic group, and a hydrophilic group in its structure by carrying out a phase conversion emulsification, and further by carrying out a crosslinking reaction with a crosslinking agent.

In more detail, a coloring material, a polymer having a polymerizable group (crosslinking reactive group), a hydrophobic group and a hydrophilic group, and a crosslinking agent are added into an organic solvent, and a neutralizing agent and, if necessary, a surface active agent (a reactive surface active agent is preferably used as the surface active agent) are added to the solution or the dispersion obtained. The mixture obtained is used as an organic solvent phase, while stirring the organic solvent phase or water, by adding the water to the organic solvent phase or by adding the organic solvent phase to the water, a phase conversion emulsification is carried out, thereby the coloring material is enclosed by "the organic phase made of the polymer having the crosslinking reactive group and a hydrophilic group and a crosslinking agent". In this case, a catalyst causing a crosslinking reaction may be added to any one of the organic solvent phase and water, but when the catalyst is oil-soluble, it is preferred to add the catalyst to the organic solvent phase and when the catalyst is water-soluble, it is preferred to add the catalyst to water. Then, after carrying out the crosslinking reaction at a definite temperature of causing the crosslinking reaction for a definite time, by distilling off the organic solvent by a general method such as a distillation method, a vacuum distillation method, etc., a dispersion wherein the colorant formed by enclosing the coloring material with the polymer having the crosslinked structure is dispersed in an aqueous phase can be obtained.

The polymer for use in the above-described method in the invention may be a polymer having at least a polymerizable group (crosslinking reactive group), a hydrophobic group and a hydrophilic group, and examples of the polymer include a vinyl-based polymer, a polyacrylic acid ester, a styrene-acrylic acid ester copolymer, polystyrene, polyester, polyamide, polyimide, polyurethane, an amino-based polymer, a silicon-containing polymer, a sulfur-containing polymer, a fluorine-containing polymer, an epoxy resin, and a mixture thereof, etc.

The hydrophilic group of the above-described polymer for use in the invention includes a carbonyl group, a carboxyl group, a hydroxyl group, a sulfone group, a sulfonic acid group, salts thereof, and a quaternary ammonium salt and the hydrophilic group is selected from these groups.

The crosslinking reactive group of the polymer for use in the invention described above includes a glycidyl group, an isocyanate group, a hydroxyl group, a carboxyl group, and an unsaturated hydrocarbon group, and the group is selected from these groups. The unsaturated hydrocarbon group described above includes a vinyl group, an allyl group, an acrylic group, an acryloyl group, a methacryloyl group, a propenyl group, a vinylidene group, and a vinylene group, and the group is selected from these groups.

In a preferred embodiment of the invention, as the above-described polymer, a vinyl-based polymer, a poly (meth) acrylic acid ester, or a styrene-(meth)acrylic acid copolymer is used. The polymer can be obtained by carrying out a solution polymerization of a (meth)acrylic acid ester monomer having at least one hydrophilic group selected from the group consisting of a sulfone group, a sulfonic acid group, a carboxyl group, a hydroxyl group, the salts thereof, and a quaternary ammonium group, a (meth)acrylic acid ester monomer having a crosslinking reactive group such as a glycidyl group, an isocyanate group, etc., and a monomer copolymerizable with these monomers in a solvent such as an aliphatic hydrocarbon-based solvent, an aromatic hydrocarbon-based solvent, an ester-based solvent, a ketone-based solvent, an alcohol-based solvent, an aprotic solvent, etc., in the existence of a polymerization initiator, for example, a peroxide such as t-butyl peroxybenzoate, di-t-butyl peroxide, cumene perhydroxide, acetyl peroxide, benzoyl peroxide, lauroyl peroxide, etc.; or an azo compound such as azobisisobutyronitrile, azobis-2,4-dimethyl valeronitrile, azobis-cyclohexane carbonitrile, etc.

In the case of a solution polymerization, a polymerization chain-transfer agent may be further added. Examples of the polymerization chain-transfer agent include mercaptans such as octyl mercaptan, n-dodecyl mercaptan, t-dodecyl mercaptan, n-hexadecyl mercaptan, n-tetradecyl mercaptan, t-tetradecyl mercaptan, etc.; xanthogen disulfides such as dimethyl xanthogen disulfide, diethyl xanthogen sulfide, diisopropyl xanthogen disulfide, etc.; thiuram disulfides such as tetramethylthiuram disulfide, tetraethylthiuram disulfide, tetrabutylthiuram disulfide, etc.; halogenated hydrocarbons such as carbon tetrachloride, ethylene bromide, etc.; hydrocarbons such as pentaphenylethane, etc.; and acrolein, methacrolein, allyl alcohol, 2-ethylhexyl thioglycolate, $\alpha$-terpinene, $\gamma$-terpinene, dipentene, and an $\alpha$-methylstyrene dimer (dimers containing at least 50 parts by weight of 2,4-diphenyl-4-mehyl-1-pentene are preferred). Furthermore, there are unsaturated cyclic hydrocarbon compounds such as 9,10-dihydroanthracene, 1,4-dihydronaphthalene, indene, 1,4-cyclohexadiene, etc.; unsaturated heterocyclic compounds such as xanthene, 2,5-dihydrofuran, etc. They may be used singly or as a combination of two or more kinds of them.

The polymerization is usually carried out at a temperature of from 30 to 100° C., and preferably from 50 to 80° C. for from 1 to 10 hours, and they are appropriately selected according to the kinds of the radical polymerization initiator, monomers and the solvent used. Also, it is preferred that the polymerization is carried out under an inert gas atmosphere such as nitrogen, etc. After the polymerization, the copolymer formed can be isolated from the reaction liquid by a known method such as a re-precipitation, the solvent removal by distillation, etc. Also, the copolymer obtained can be purified by removing unreacted monomer, etc., by repeating the re-precipitation, a membrane separation method, a chromatographic method, an extraction method, etc. The weight average molecular weight of the polymer thus obtained is preferably from 1000 to 50,000, and more preferably from 1000 to 30,000 from the view points of easiness of enclosing a coloring material and the easiness of carrying out crosslinking.

Examples of the (meth)acrylic acid ester monomer having a hydrophilic group include, as an acrylic monomer having a carboxyl group, acrylic acid, methacrylic acid, crotonic acid, ethylacrylic acid, propylacrylic acid, isopropylacrylic acid, itaconic acid, and fumaric acid. In these monomers, acrylic acid and methacrylic acid are preferred. As the (meth)acrylic monomer having a sulfonic acid group, there are sulfoethyl methacrylate, butylacrylamide sulfonic acid, etc. Also, as the (meth)acrylic monomer having a phosphone group, there are phosphoethyl methacrylate, etc.

As the (meth)acrylic acid ester having a crosslinking reactive group, there are a polymerizable monomer having a block isocyanate group, a monomer having an epoxy group, a monomer having a 1,3-dioxolane-2-one-4-yl group, etc. The polymerizable monomer having a block isocyanate group can be easily obtained by addition reaction of a polymerizable monomer having an isocyanate group, such as 2-methacroyloxyethyl isocyanate, etc., with a known blocking agent. Also, the polymerizable monomer can be produced by addition reaction of a vinyl-based copolymer having a hydroxyl group and a carboxyl group with a compound having an isocyanate group and a block isocyanate group. As the monomer having an epoxy group, there are, for example, glycidyl (meth)acrylate and a (meth) acrylate monomer having an alicyclic epoxy group. Also, as a monomer having a 1,3-dioxolane-2-one-4-yl group, there are, for example, 1,3-dioxolane-2-one-4-yl methyl(meth) acrylate and 1,3-dioxolane-2-one-4-yl methyl vinyl ether.

The monomer copolymerizable with these monomers include those described below.

For example, there are (meth)acrylic acid esters such as methyl acrylate, ethyl acrylate, isopropyl acrylate, n-propyl acrylate, n-butyl acrylate, t-butyl acrylate, 2-ethylhexyl acrylate, n-octyl acrylate, lauryl acrylate, benzyl acrylate, methyl methacrylate, ethyl methacrylate, isopropyl methacrylate, n-propyl methacrylate, isobutyl methacrylate, t-butyl methacrylate, 2-ethylhexyl methacrylate, n-octyl methacrylate, lauryl methacrylate, stearyl methacrylate, tridecyl methacrylate, benzyl methacrylate, etc.; the addition reaction products of oil fatty acids and (meth)acrylic acid ester monomers having an oxysilane structure, such as the addition reaction product of stearic acid and glycidyl methacrylate, etc.; the addition reaction products of oxysilane compounds containing an alkyl group having at least 3 carbon atoms and (meth)acrylic acid; styrene-based monomers such as styrene, α-methylstyrene, o-methylstyrene, m-methylstyrene, p-methylstyrene, p-tert-butylstyrene, etc.; itaconic acid esters such as benzyl itaconate, ethyl itaconate, etc.; maleic acid esters such as dimethyl maleate, diethyl maleate, etc.; fumaric acid esters such as dimethyl fumarate, diethyl fumarate, etc.; and acrylonitrile, methacrylonitrile, vinyl acetate, isobornyl acrylate, isobornyl methacrylate, aminoethyl acrylate, aminopropyl acrylate, methylaminoethyl acrylate, methylaminopropyl acrylate, ethylaminoethyl acrylate, ethylaminopropyl acrylate, aminoethylamide acrylate, aminopropylamide acrylate, aminoethylamide acrylate, aminopropylamide acrylate, methylaminoethylamide acrylate, methylaminopropylamide acrylate, ethylaminoethylamide acrylate, ethylaminopropylamide acrylate, amide methacrylate, aminoethyl methacrylate, aminopropyl methacrylate, methylaminoethyl methacrylate, methylaminopropyl methacrylate, ethylaminoethyl methacrylate, ethylaminopropyl methacrylate, aminoethylamide methacrylate, aminopropylamide methacrylate, methylaminoethylamide methacrylate, methylaminopropylamide methacrylate, ethylaminoethylamide methacrylate, ethylaminopropylamide methacrylate, hydroxymethyl acrylate, 2-hydroxyethyl acrylate, 2-hydroxypropyl acrylate, hydroxymethyl methacrylate, 2-hydroxyethyl methacrylate, 2-hydroxypropyl methacrylate, N-methylolacrylamide, allyl alcohol, etc.

The crosslinking agent is a component of causing crosslinking by reacting with the crosslinking reactive group of the above-described polymer, and the crosslinking agent having at least two functional groups reacting with the crosslinking reactive group of the above-described polymer in the molecular structure is used.

When the crosslinking reactive group of the above-described polymer is a glycidyl group, it is preferred to use a compound having at least two functional groups selected from an amino group, a carboxyl group, a hydroxyl group, an N-methylol group and an N-methylol ether group, and examples of such a compound include aliphatic amines such as ethylene amines, N-aminoethylpiperazine, methaxylenediamine, 1,3-bis(aminomethyl)cyclohexane, polyamide, etc.; cycloaliphatic amines such as para-methanediamine, mesophoronediqamine, bis(4-amino-3-methylcyclohexyl)methane, 2-ethyl-4-methylimidazole, etc.; aromatic amines such as methaphenylenediamine, 4,4'-diaminodiphenylamine, 4,4'-diaminodiphenylsulfone, dicyandiamide, etc.; and acid anhydrides such as phthalic anhydride, pyromellitic anhydride, nadic anhydride, etc.

When the crosslinking reactive group of the above-described polymer is an isocyanate group, it is preferred to use a compound having at least two of at least one functional group selected from a carboxyl group, a hydroxyl group, an amino group, and a mercapto group and examples of the compound include polyols such as polyether polyol, polytetraethylene glycol, an alkylene oxide copolymer polyol, an epoxy resin-modified polyol, a lactone-based polyester polyol, a condensed polyester polyol, polycarbonate diol, acrylic polyol, polybutadiene polyol, a phosphorus-containing polyol, a halogen-containing polyol, etc.; polyamines such as polyether polyamine, polytetraethylene ether diamine, an alkylene oxide copolymer polyamine, an epoxy-modified polyamine, a condensed polyester polyamine, polycarbonate polyamine, acrylic polyamine, etc.; and polythiols such as polyether polythiol, polytetramethylene ether dithiol, an alkylene oxide copolymer polythiol, an epoxy resin-modified polyol, a lactone-based polyester polythiol, a condensed polyester polythiol, polycarbonate dithiol, acrylic polythiol, polybutadiene polythiol, a phosphorus-containing polythiol, a halogen-containing polythiol, etc.

When the crosslinking reactive group of the above-described polymer is a hydroxy group, it is preferred to use a compound having at least two of at least one functional group selected from a glycidyl group and an isocyanate group.

When the crosslinking reactive group of the above-described polymer is an unsaturated hydrocarbon group, it is preferred to use a compound having at least two of at least one unsaturated hydrocarbon groups selected from a vinyl group, am allyl group, an acryloyl group, a methacryloyl group, a propenyl group, a vinylidene group, and a vinylene group. Examples of such a compound include ethylene glycol diacrylate, diethylene glycol diacrylate, triethylene glycol diacrylate, tetraethylene glycol diacrylate, polyethylene glycol diacrylate, allyl acrylate, bis(acryloxyethyl) hydroxyethyl isocyanurate, bis(acryloxy-neopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy.diethoxy)phenyl]propane, 2,2-bis[4-(acryloxy-ethoxy.polyethoxy)phenyl]propane, hydroxypivalic acid neopentyl glycol diacrylate, 1,4-butanediol diacrylate, dicyclopentanyl diacrylate, dipentaerythritol hexa-acrylate, dipentaerythritol monohydroxy penta-acrylate, ditrimethylolpropane tetra-acrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxy-propane, 2,2-bis[4-(methacryloxy)phenyl] propane, 2,2-bis[4-(methacryloxyethoxy)phenyl]propane, 2,2-bis[4-(methacryloxy-ethoxydiethoxy)phenyl]propane, 2,2-bis[4-(methacryloxyethoxy-polyethoxy)phenyl] propane, tetrabromobisphenol A dimethacrylate, dicyclopentanyl dimethacrylate, dipentaerythritol hexa-methacrylate, glycerol dimethacrylate, hydroxypivalic acid neopentyl glycol dimethacrylate, dipentaerythritol monohydroxy penta-methacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, diethylene glycol bisallyl carbonate, etc.

It is preferred that the above-described crosslinking agent is added to the organic solvent phase in a range of from 0.01 to 0.1 by weight ratio to the weight of the polymer having a crosslinking reactive group and a hydrophilic group. Weight ratios of less than 0.01 is undesirable since in this case, the increase of the viscosity, clogging of a nozzle, the reduction of ejection stability, etc., occur in the case of using for a long period of time. Also, weight ratios exceeding 0.1 is undesirable since in the case, lowering of the scrubbing resistance and increase of the particle sizes, etc., occur.

As the catalyst used for the crosslinking reaction, a compound having the effect of causing or accelerating the reaction may be used. When the crosslinking reactive group of the above-described polymer is an unsaturated hydrocarbon group and when the compound having at least two unsaturated hydrocarbon groups selected from a vinyl group, an allyl group, an acryloyl group, a methacryloyl group, a propenyl group, a vinylidene group, and a vinylene group is used as the crosslinking agent, each of an oil-soluble radical polymerization initiator, for example, a peroxide such as t-butyl peroxybenzoate, di-t-butyl peroxide, cumene perhydroxide, acetyl peroxide, benzoyl peroxide, lauroyl peroxide, etc., or an azo compound such as azobis-isobutylnitrile, azobis-2,4-dimethylvaleronitrile, azobis-cyclohexanecarbonitrile, etc., and a water-soluble radical polymerization initiator such as potassium persulfate, ammonium persulfate, sodium persulfate, 2,2-azobis(2-methyl-propionamidine)di-hydrochloride, and 4,4-azobis(4-cyanovaleric acid) can be used. In addition, the addition amount of the catalyst is appropriately determined.

There is no particular restriction on the organic solvent used for the organic solvent phase, and an organic solvent dissolving the polymer having at least the crosslinking reactive group and the hydrophilic group described above may be used. From the viewpoint of the easiness of distilling off an organic solvent, an low-boiling organic solvent is preferably used. For example, there are ketone-based organic solvents such as acetone, methyl ethyl ketone, etc.; ester-based organic solvents such as ethyl acetate, etc.; alcohol-based organic solvents such as ethanol, isopropyl alcohol, etc.; and aromatic hydrocarbon-based organic solvents such as benzene, etc.

The addition amount of the polymer having a crosslinking reactive group and a hydrophilic group is appropriately determined in the range of from 0.3 to 1.5 by weight ratio to the coloring material but it is preferred to control and determine the addition amount such that the mean particle size of the colorant becomes not larger than 400 nm, and preferably not larger than 200 nm, and the amounts of water-soluble substances originated in the polymer having a crosslinking reactive group and a hydrophilic group in an aqueous phase after production become not larger than 1000 ppm.

The mixture containing at least the coloring material, the polymer having a crosslinking reactive group and a hydrophilic group, and a crosslinking agent in an organic solvent can be prepared by (a) a method of dispersing the coloring material in an organic solvent phase having dissolved therein "the polymer having a crosslinking reactive group and a hydrophilic group", using a dispersing apparatus such as a bead mill, a roll mill, a sand mill, etc., and further dissolving therein the crosslinking agent and, as the case may be, an oil-soluble catalyst, or (b) a method of dispersing by flashing a dispersion of the coloring material in water (for example, a wet cake of a pigment) in "the polymer having a crosslinking reactive group and a hydrophilic group" by the dispersing apparatus as described above, and further dissolving or dispersing the crosslinking agent and, as the case may be, an oil-soluble catalyst.

For the purpose of enhancing the dispersing property of a pigment, a dispersing agent or a surface active agent is generally used but in the invention, a reactive surface active agent is preferably used. In addition, the reactive surface active agent described above is the same as the polymerizable surface active agent described hereinbelow. As the reactive surface active agent, a surface active agent which reacts with the polymer having a crosslinking reactive group and a hydrophilic group or the crosslinking agent is used. By using the reactive surface active agent, "the deterioration of the printed images by the generation of bleeding, etc., on a plain paper and the ejection failure by wetting the periphery of a nozzle of a printer head", which are liable to occur with an ink composition using a colorant produced using a generally used dispersing agent or surface active agent, are restrained. In addition, for fining the colorant obtained, it is preferred that the phase conversion emulsification is carried out while applying ultrasonic waves.

Other preferred embodiment of the invention is an ink jet recording ink composition containing at least a colorant enclosing a coloring material with a polymer having a crosslinked structure constituted by a copolymer of a dispersing agent having at least a polymerizable group and a crosslinkable monomer, a water-soluble organic solvent, and water. The above-described polymer having a crosslinked structure includes, as a matter of course, a polymer obtained by copolymerizing a dispersing agent having a polymerizable group, a crosslinkable monomer, and a monomer copolymerizable with these monomers.

The colorant obtained by enclosing a coloring material with the polymer having the crosslinked structure constituted by at least the copolymer of the dispersing agent having a polymerizable group and the crosslinkable monomer means an encapsulated particle wherein the coloring material is in a fine, stable and complete state.

The colorant in the invention formed by enclosing a coloring material with the polymer having the crosslinked structure constituted by at least the copolymer of the dispersing agent having a polymerizable group and the crosslinkable monomer is excellent in the dispersion stability in an aqueous medium made of a water-soluble organic solvent and water. In particular, the colorant has a good dispersion stability in an aqueous medium made of water and a water-soluble organic solvent selected from the group consisting of an acetylene glycol and/or acetylene alcohol-based surface active agent, diethylene glycol monobutyl ether, triethylene glycol monobutyl ether, propylene glycol monobutyl ether, dipropylene glycol monobutyl ether and/or 1,2-alkylene glycol. The reason has not yet been clarified but it is presumed that since by encapsulating as described above, the enclosing polymer is more strongly fixed to the coloring material as compared with the case that a dispersing agent is simply adsorbed onto the surface of the coloring material by a van der Waals force and the enclosing polymer has a crosslinked structure, whereby the solvent resistance is improved. In addition, the above-described theory is used for explaining the content of the invention to the utmost and the scope of the invention is not limited by the theory only.

The dispersing agent having a polymerizable group for use in the invention may be a dispersion containing at least a polymerizable group, a hydrophobic group and a hydrophilic group in its molecular structure and as such a dispersing agent, there are a polymeric dispersing agent having introduced therein a polymerizable group and a surface active agent having introduced therein a polymerizable group.

The polymerizable group may be a functional group, which causes a polymerization reaction such as a radical polymerization, a polyaddition, a polycondensation, etc. The radical polymerizable group includes unsaturated hydrocarbon groups such as a vinyl group, an allyl group, an acryloyl group, a methacryloyl group, a vinylidene group, a vinylene group, etc. The polyaddition reactive group includes an isocyanate group and an isothiocyanate group, and as the group reacting with these groups, there are a hydroxyl group, an amino group, a mercapto group, a carboxyl group, etc. The polycondensation reactive group is a functional group capable of causing a condensation reaction and includes a carboxyl group, a hydroxyl group, an amino group, an alkoxy group, etc.

In a preferred embodiment of the invention, the polymerizable group is preferably "an unsaturated hydrocarbon group which is a radical polymerizable group" and it is preferred that such an unsaturated hydrocarbon group is selected from the group consisting of a vinyl group, an allyl group, an acrylic group, an acryloyl group, a methacryloyl group, a propenyl group, a vinylidene group, and a vinylene group.

Also, in a preferred embodiment of the invention, it is preferred that the hydrophilic group is selected from the group consisting of a carboxyl group, a carbonyl group, a hydroxyl group, a sulfone group, a sulfonic acid group, salts thereof, and a quaternary ammonium salt.

As the polymeric dispersing agent having introduced therein a polymerizable group, the following dispersing agents each obtained by introducing a polymerizable group into a synthetic polymer can be used. Specific examples of the synthetic polymer include acrylic resins such as polyvinyl alcohols, polyvinyl pyrrolidones, polyacrylic acid, an acrylic acid-acrylonitrile copolymer, a potassium acrylate-acrylonitrile copolymer, a vinyl acetate-acrylic acid ester copolymer, an acrylic acid-acrylic acid ester copolymer, etc.; styrene-acrylic resins such as a styrene-acrylic acid copolymer, a styrene-methacrylic acid copolymer, a styrene-methacrylic acid-acrylic acid copolymer, a styrene-α-methylstyrene-acrylic acid copolymer, a styrene-α-methylstyrene-acrylic acid ester copolymer, etc.; a styrene-maleic acid copolymer; a styrene maleic anhydride copolymer; a vinylnaphthalene-acrylic acid copolymer; a vinylnaphthalene-maleic acid copolymer; and vinyl acetate-based copolymers such as a vinyl acetate-ethylene copolymer, a vinyl acetate-fatty acid vinylethylene copolymer, a vinyl acetate-malic acid ester copolymer, a vinyl acetate-crotonic acid copolymer, a vinyl acetate-acrylic acid copolymer, etc.; and salts thereof. In these polymers, particularly, the copolymer of a monomer having a hydrophobic group and a monomer having a hydrophilic group and the polymer made of a monomer having a hydrophobic group and a hydrophilic group together in the molecular structure are preferred.

In the invention, as a preferred embodiment, a polymerizable surface active agent is used as the dispersion having a polymerizable group.

The polymerizable surface active agent for use in the invention has at least a polymerizable group, a hydrophobic group, and a hydrophilic group in the molecular structure.

In the polymerizable surface active agent for use in the invention, it is preferred that the hydrophilic group thereof is selected from the group consisting of a sulfone group, a sulfonic acid group, a carboxyl group, a carbonyl group, a hydroxyl group, salts thereof, and a quaternary ammonium salt. Also, it is preferred that the polymerizable group is an unsaturated hydrocarbon group and more specifically is selected from the group consisting of a vinyl group, a vinyl group, an allyl group, an acrylic group, an acryloyl group, a methacryloyl group, a propenyl group, a vinylidene group, and a vinylene group. Specific examples of the polymerizable surface active agent include "the anionic allyl derivatives" as described in Japanese Patent Publication Nos. 46291/1974 and 24142/1989, and Japanese Patent Laid-Open No. 104802/1987, "the anionic propenyl derivatives" as described in Japanese Patent Laid-Open No. 221431/1987, "the anionic acrylic acid derivatives" as described in Japanese Patent Laid-Open Nos. 34947/1987 and 11525/1980, "the anionic itaconic acid derivatives" as described in Japanese Patent Publication No. 34898/1971 and Japanese Patent Laid-Open No. 30284/1976, "the anionic maleic acid derivatives" as described in Japanese Patent Publication No. 4157/1976 and Japanese Patent Laid-Open No. 30284/1976, "the nonionic allyl derivatives" as described in Japanese Patent Laid-Open No. 104802/1987, "nonionic propenyl derivatives" as described in Japanese Patent Laid-Open No. 100502/1987, "the nonionic acrylic acid derivatives" as described in Japanese Patent Laid-Open No. 28208/1981, "the nonionic itaconic acid derivatives" as described in Japanese Patent Publication No. 12681/1984, "the nonionic derivatives" as described in Japanese Patent Publication No. 65824/1992, and "the cationic allyl derivatives" as described in Japanese Patent Publication No. 65824/1992.

Since the polymerizable surface active agent adsorbs on the surfaces of coloring material particles and is excellent in the dispersibility (that is, the occurrence of the aggregation of the particles each other can be prevented) under the polymerization condition thereafter, the polymerizable surface active agent is useful in the point that the encapsulated particles are easily formed.

In the invention, as the polymerizable surface active agent, the compounds represented by following formula (I) or (II) are preferred. In addition, the polymerizable surface active agents shown by the formula (I) are disclosed in Japanese Patent Publication Nos. 320276/1993 and 316909/1998.

Formula (I)

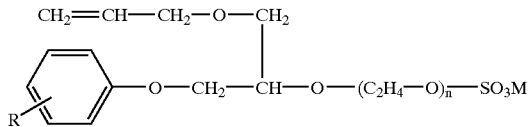

In the above formula (I), R represents a hydrogen atom or a hydrocarbon group having from 1 to 12 carbon atoms; n represents a number of from 2 to 20; and M represents an alkali metal, an ammonium salt or an alkanolamine.

Formula (II)

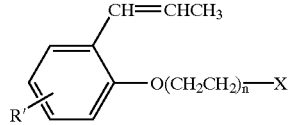

In the above formula (II), $R^1$ represents a hydrogen atom or a hydrocarbon group having from 1 to 12 carbon atoms; X represents —$SO_3NH_4$ or —H; and n represents a number of from 2 to 20.

In addition, $R^1$ is preferably $C_9H_{19}$— or $C_8H_{17}$—.

By appropriately controlling R and n in the formula (I), it is possible to correspond to the extent of the hydrophilic property or the hydrophobic property of the surface of the coloring material. The preferred polymerizable surface active agent shown by the formula (I) is practically the compounds represented by following formulae (III) to (VI). They can be used singly or as a mixture of two or more kinds of them.

As the polymerizable surface active agent shown by the formula (I), commercially available products can be used. For example, "SE-10N" of Adekarea Soap SE Series of ASAHI DENKA KOGYO K. K. corresponds to the compound shown by the following formula (III), wherein R is $C_9H_{19}$, n is 10, and M is $NH_4$. Also, "SE-20N" is the same as "SE-10N" but n is 20.

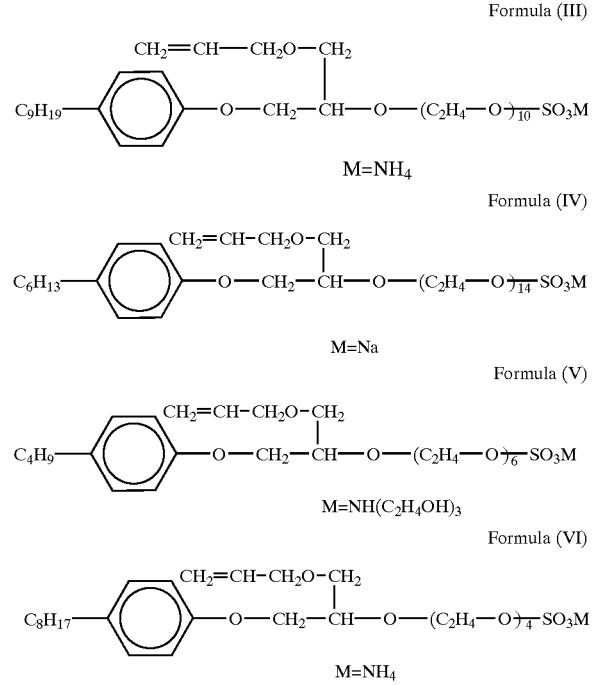

Formula (III)

$M=NH_4$

Formula (IV)

$M=Na$

Formula (V)

$M=NH(C_2H_4OH)_3$

Formula (VI)

$M=NH_4$

In a preferred embodiment of the invention, fine and stable encapsulated particles each formed by enclosing each coloring material with the polymer of the polymerizable surface active agent shown by the formula (I) or (II), the crosslinkable monomer, and the monomer copolymerizable with these monomers are used.

The fine and stable encapsulated particles of the coloring material are stably dispersed in an aqueous medium. Since the polymerizable surface active agent shown by the formula (I) or (II) is excellent in the adsorbing property to the surfaces of the coloring material particles and the dispersibility (that is, the occurrence of the aggregation of the particles each other can be prevented) under the polymerization condition thereafter, the polymerizable surface active agent is useful in the point that the encapsulated particles are easily formed.

As the polymerizable surface active agent, other commercially available products than the above-described commercially available products can be used. For example, there are Aquaron HS Series (Aquaron HS-05, HS-10, HS-20, and HS-1025), Aquaron RN Series (RN-10, RN-20, RN-30. RN-50, and RN-2025), and New Frontier Series (New Frontier N-177E and S-510) of DAI-ICHI KOGYO SEIYAKU CO., LTD., and Adekarea Soap NE Series (NE-10, NE-20, NE-30. NE-40, and NR-50) of ASAHI DENKA KOGYO K. K.

The addition amount of the polymerizable surface active agent is in the range of preferably from about 10 to 150% by weight, and more preferably from about 20 to 100% by weight to the coloring material. By the addition amount of the polymerizable surface active agent to at least 10% by weight, the dispersion stability of the ink composition can be improved. Also, when the upper limit of the addition amount thereof is not more than 150% by weight, the generation of the polymerizable surface active agent non-adsorbed to the coloring material is restrained, and the generation of a polymer other than the encapsulated particles can be prevented, whereby the ejection stability of the ink composition can be improved.

As the crosslinkable monomer for use in the invention, any monomers having a high copolymerizable property with the polymerizable surface active agent can be used.

As the crosslinkable monomer for use in the invention, a compound having at least two of at least one unsaturated hydrocarbon group selected from a vinyl group, an allyl group, an acrylic group, an acryloyl group, a methacryloyl group, a propenyl group, a vinylidene group, and a vinylene group is preferably used, and examples of such a compound include ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis (acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy) phenyl]-propane, 2,2-bis[4-(acryloxyethoxy.diethoxy) phenyl]propane, 2,2-bis[4-(acryloxyethoxy.polyethoxy) phenyl]propane, hydroxypivalic acid neopentyl glycol diacrylate, 1,4-butanediol diacrylate, dicyclopentanyl diacrylate, dipentaerythritol hexa-acrylate, dipentaerythritol monohydroxy penta-acrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxy-propane, 2,2-bis[4-(methacryloxy)phenyl] propane, 2,2-bis[4-(methacryloxyethoxy)phenyl]propane, 2,2-bis[4-(methacryloxy-ethoxypolyethoxy)phenyl] propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxy penta-methacrylate, ditrimethylolpropane tetra-methacrylate, pentaerythritol trimethacrylate, pentaerythritol tetra-methacrylate, triglycerol dimethacrylate, trimethylolpropane trimethacrylate, tris(methacryloxyethyl) isocyanate, allyl methacrylate, divinylbenzene, diallyl phthalate, diallyl terephthalate, diallyl isophthalate, diethylene glycol bisallyl carbonate, etc.

The addition amount of the above-described crosslinkable monomer is in the range of preferably from 0.1 to 50% by weight, and more preferably from 0.1 to 10% by weight as the constitution ratio of the enclosing polymer. When the addition amount is less than 0.1% by weight, the increase of the viscosity, clogging of a nozzle, and the deterioration of the ejection stability undesirably occur in the case of using for a long period of time. Also, when the addition amount exceeds 50% by weight, the desired colorant is undesirably hard to obtain.

In the invention, as the monomer copolymerizable with the polymerizable surface active agent and the crosslinkable monomer, a radical polymerizable monomer, which is generally used, can be used. As the radical polymerizable monomer, there is a monomer having at least one unsaturated hydrocarbon group such as a vinyl group, an allyl group, an acrylic group, a methacrylic group, a vinylidene group, a vinylene group, etc., which are radical polymerizable groups, in the molecule.

Specific examples of the radical polymerizable monomer include styrene and styrene derivatives such as methylstyrene, dimethylstyrene, chlorostyrene, dichlorostyrene, bromostyrene, p-chloromethylstyrene, divinylbenzene, etc.; acrylic acid and monofunctional acrylic acid esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentinyl acrylate, dicyclopentinyloxyethyl acrylate, tetrahydrofurfuryl acrylate, isobornyl acrylate, 2-hydroxyethyl acrylate, 2-hydroxypropyl acrylate, 2-acryloyloxyethyl succinate, 2-acryloyloxyethyl phthalate, caprolactone acrylate, glycidyl acrylate, etc.; methacrylic acid and monofunctional methacrylic acid esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, 2-methacryloyloxyethyl succinate, 2-methacryloyloxyethyl phthalate, caprolactone methacrylate, glycidyl methacrylate, etc.; allyl compounds such as allylbenzene, allyl-3-cyclohexane propionate, 1-allyl-3,4-dimethoxybenzene, allylphenoxy acetate, allylphenyl acetate, allyl cyclohexane, allyl polyhydric carboxylate, etc.: and monomers having a radical polymerizable group such as acrylonitrile, methacrylonitrile, maleic anhydride, N-substituted maleimides, cyclic olefins, etc.

Also, there are triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxy-propane, 2.2-bis[4-(methacryloxy)phenyl] propane, 2,2-bis[4-(methacryloxyethoxy)phenyl]propane, 2,2-bis[4-(methacryloxy-diethoxy)phenyl]propane, 2,2-bis[4-(methacryloxypolyethoxy)-phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxy dimethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, diethylene glycol carbonate, etc.

Since the polymerizable surface active agent shown by the formula (I) is a monomer having a high electron donating property, as the monomer used, a monomer having a high electron accepting property is preferred. As specific examples of the monomer having a high electron accepting property, there are acrylonitrile, fumaronitrile, fumaric acid diesters such as fumaric acid dibutyl ester, etc.; maleic acid diesters such as maleic acid dibutyl ester, etc.; and vinylidene cyanide. They can be used singly or as a mixture of two or more kinds thereof.

The addition amount of the monomer is in the range of preferably from about 2 to 15 by molar ratio and more preferably from 3 to 12 by molar ratio to the polymerizable surface active agent. By making the addition amount of the monomer at least 2 by molar ratio, the encapsulated coloring material particles become excellent in the dispersion stability in an aqueous medium. Also, by making the addition amount of the monomer not more than 15 by molar ratio, the monomer can be sufficiently dissolved in the polymerizable surface active agent-adsorbed layer and thus since the generation of a monomer insoluble in water and the occurrence of the relative reduction of the amount of an ionic repulsing group can be restrained, the dispersion stability of the ink composition can be increased.

As the polymerization initiator for use in the invention, a water-soluble polymerization initiator such as potassium persulfate, sodium persulfate, ammonium persulfate, 2,2-azobis(2-methylpropionamidine) dihydrochloride, and 4,4-azobis(4-cyanovaleric acid), etc., is used.

As mentioned above, the preferred embodiments of the invention were explained by mainly referring to "the polymer having the crosslinked structure" as the polymer used in the invention, but in the invention is not limited to the embodiments only and "a polymer without having a crosslinked structure" described below can be used.

That is, in the invention, as the polymer enclosing a pigment and/or a dye, there is a copolymer of a dispersing agent having a polymerizable group and a copolymerizable monomer, which is described later in detail.

A colorant enclosing a pigment and/or a dye with the above-described copolymer of the dispersion having a polymerizable group and the copolymerizable monomer is suitably obtained by, after dispersing the pigment and/or the dye in water with the dispersing agent having a polymerizable group, adding the polymerizable monomer and a polymerization initiator to cause polymerization.

Since as an ink jet recording ink, it is preferred that the particle sizes are uniform from the viewpoints of preventing clogging a nozzle and ensuring the stability of ejection of the ink, it is preferred that the colorant enclosing a pigment and/or a dye with the polymer is produced by an emulsion polymerization method.

In the case of using pigment, it is preferred that the colorant enclosing the pigment with the polymer is obtained by dispersing the pigment in water with the dispersing agent having a polymerizable group and thereafter, carrying out the emulsion polymerization in water using a monomer (the copolymerizable monomer) copolymerizable with the dispersing agent. Also, the colorant enclosing a dye with the polymer is preferably obtained by a method of directly dissolving a dye insoluble or sparingly soluble in water, such as an oil-soluble dye, a disperse dye, a vat dye, a reactive dye, etc., in the monomer, and obtaining by an emulsion polymerization. The emulsion polymerization can be carried out using an ordinary method, and the polymerization is proceeded by a free radical generated by the thermal decomposition of a water-soluble polymerization initiator in the existence of an emulsifying agent.

It is preferred that the above-described copolymerizable monomer is a compound having an unsaturated group in the structure and it is particularly preferred that the unsaturated group is selected from the group consisting of a vinyl group, an allyl group, an acryloyl group, a methacryloyl group, a propenyl group, an acrylamide group, a vinylamide group, a vinylidene group, and a vinyl group. More practically, any monomer having a high copolymerizing property with the dispersing agent having a polymerizable group can be used, and a radical polymerizable monomer, which is generally used, can be used.

As the radical polymerizable monomer, there are monomers each having in the molecule at least one unsaturated hydrocarbon group such as a vinyl group, an allyl group, an acryloyl group, a methacryloyl group, a propenyl group, an acrylamide group, a vinylamide group, a vinylidene group, a vinylene group, etc.

Specific examples of the radical polymerizable monomer include styrene and styrene derivatives such as methylstyrene, dimethylstyrene, chlorostyrene, dichlorostyrene, bromostyrene, p-chloromethylstyrene, divinylbenzene, etc.; acrylic acid and monofunctional acrylic acid esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, 2-acryloyloxyethyl succinate, 2-acryloyloxyethyl phthalate, caprolactone acrylate, glycidyl acrylate, etc.; methacrylic acid and monofunctional methacrylic acid esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, 2-methacryloyloxyethyl succinate, 2-methacryloyloxyethyl phthalate, caprolactone methacrylate, glycidyl methacrylate, etc.; aminoethyl acrylate, aminopropyl acrylate, methylaminoethyl acrylate, methylaminopropyl acrylate, ethylaminoethyl acrylate, ethylaminopropyl acrylate, aminoethylamide acrylate, aminopropylamide acrylate, methylaminoethylamide acrylate, methylaminopropylamide acrylate, ethylaminoethylamide acrylate, ethylaminopropylamide acrylate, amide methacrylate, aminoethyl methacrylate, aminopropyl methacrylate, methylaminoethyl methacrylate, ethylaminopropyl methacrylate, aminoethylamide methacrylate, aminopropylamide methacrylate, methylaminoethylamide methacrylate, methylaminopropylamide methacrylate, ethylaminoethylamide methacrylate, ethylaminopropylamide methacrylate, hydroxymethyl acrylate, hydroxymethyl methacrylate, N-methylol acrylamide; allyl compounds such as allyl alcohol, allyl benzene, allyl-3-cyclohexane propionate, 1-allyl-3,4-dimethoxybenzene, allylphenoxy acetate, allylphenyl acetate, allyl cyclohexane, allyl polyhydric carboxylates, etc.; fumaric acid, maleic acid, itaconic acid, and the esters of them; and monomers having a radical polymerizable group, such as acrylonitrile, methacrylonitrile, maleic anhydride, N-substituted maleimides, cyclic olefins, etc.

Particularly, as the copolymerizable monomer, a monomer having a hydrophilic group (e.g., a carboxyl group, a sulfonic acid group, a hydroxyl group, an amide group, and a phosphone group) is preferably used.

Examples of the monomer having a carboxyl group include acrylic acid, methacrylic acid, crotonic acid, ethacrylic acid, propylacrylic acid, isopropylacrylic acid, 2-acryloxyethyl succinic acid, 2-acryloxyethyl phthalic acid, 2-methacryloxyethyl succinic acid, 2-methacryloxyethyl phthalic acid, itaconic acid, fumaric acid, and maleic acid. In these monomers, acrylic acid and methacrylic acid are preferred.

Examples of the monomer having a sulfonic acid group include 4-styrenesulfonic acid and the salts thereof, vinylsulfonic acid and the salts thereof, sulfoethyl acrylate and the salts thereof, sulfoethyl methacrylate and the salts thereof, sulfoalkyl acrylates and the salts thereof, sulfoalkyl methacrylates and the salts thereof, sulfopropyl acrylate and the salts thereof, sulfopropyl methacrylate and the salts thereof, sulfoaryl acrylate and the salts thereof, sulfoaryl methacrylate and the salts thereof, butylamidosulfonic acid and the salts thereof, and 2-acrylamido-2-methylpropane sulfonic acid and the salts thereof.

Examples of the monomer having a hydroxyl group include 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, polyethylene glycol 400 acrylate, polyethylene glycol 400 methacrylate, N-hydroxyethyl acrylate, and N-hydroxyethyl methacrylate.

Examples of the monomer having an amide group include acrylamide, methacrylamide, aminopropylamide acrylate, aminopropylamide methacrylate, aminoethylamide acrylate, aminoethylamide methacrylate, and vinylpyrrolidone. As the monomer having a phosphone group, there are phosphoethyl methacrylate, etc.

Since the polymerizable surface active agent shown by the formula (I), which is preferred as the dispersing agent having a polymerizable group (see the above description), is a monomer having a high electron donating property, the monomer having a high electron accepting property is preferred as the copolymerizable monomer used.

As the specific examples of the monomer having a high electron accepting property, there are acrylonitrile, fumaronitrile, fumaric acid diesters such as fumaric acid dibutyl ester, etc.; maleic acid diesters such as maleic acid dibutyl ester, etc.; maleimides such as N-phenylmaleimide, etc., and vinylidene cyanide, etc. They may be used singly or as a mixture of two or more kinds of them.

The addition amount of the copolymerizable monomer is in the range of preferably from about 2 to 15 by molar ratio, and more preferably from about 3 to 12 by molar ratio to the dispersing agent having a polymerizable group. By making the addition amount at least 2 by molar ratio, the encapsulated pigment particles formed have excellent dispersion stability in an aqueous medium. Also, by making the addition amount not more than 15 by molar ratio, the monomer can be sufficiently dissolved in the adsorbed layer of the dispersing agent having a polymerizable group, and since the generation of a polymer insoluble in water and the occurrence of the relative reduction of the amount of an ionic repulsing group can be restrained, the working effect that the dispersion stability of the ink is increased is obtained.

As the polymerization initiator for obtaining the copolymer of the dispersing agent having a polymerizable group and the copolymerizable monomer, there are suitably potassium persulfate, ammonium persulfate, sodium persulfate, 2,2-azobis(2-methylpropionamidine)di-hydrochloride, and 4,4-azobis(4-cyanovaleric acid), etc.

Also, in the emulsion polymerization, a chain transfer agent can be used. As the chain transfer agent, there are, in addition to t-dodecyl mercaptan, n-dodecyl mercaptan, n-octyl mercaptan, xanthogens such as dimethylxanthogen disulfide, dibutylxanthogen disulfide, etc.; dipentene, indene, 1,4-cyclohexadiene, dihydrofuran, xanthene, etc.

As a dispersing method of the pigment and/or the dye in water, a dispersing method by a method of ultrasonic wave dispersion, a bead mill, a sand mill, a roll mill, etc., can be used.

Particularly, in the case of using the pigment, it is preferred to use a dispersing apparatus such as a bead mill, s sand mill, a roll mill, etc., since fine particles of the colorant can be obtained.

(Example of Preparing Colorant Enclosing a Coloring Agent With Polymer)

In the invention, the colorant enclosing a pigment with the polymer having a crosslinked structure constituted of the polymerizable surface active agent, the crosslinkable monomer, and the monomer copolymerizable with these monomers can be produced as follows.

Fixing the polymerizable surface active agent to the pigment, that is, the encapsulation of the pigment is carried out by adding the pigment and the polymerizable surface active agent to "an aqueous organic solvent or water", after wet grinding by ultrasonic waves, a ball mill, or a sand grinder, while, if necessary, continuing the grinding treatment, adding the crosslinkable monomer and other copolymerizable monomer and/or the polymerization initiator, and carrying out the polymerization reaction at a temperature of from 40 to 100° C. for from 10 to 60 hours.

By the above operations, encapsulated pigment particles formed by enclosing the pigment with the polymer having a crosslinked structure can be obtained. The addition amount of the polymerization initiator is preferably from 0.1 to 10% by weight, and more preferably from 1 to 5% by weight to the monomers. As a preferred production method, a method according to the production method described in Japanese Patent Laid-Open No. 316909/1998 can be used.

The method of fixing the polymeric dispersing agent having a polymerizable group to the pigment, that is the production method of the encapsulation of the pigment can be carried out according to the above-described production method.

The addition amount of the colorant in the invention is preferably from 0.5 to 30% by weight, and more preferably from 1.0 to 12% by weight as described above. When the addition amount is less than 0.5% by weight, the printing density is hard to be ensured, and, on the other hand, when the addition amount exceeds 30% by weight, there are undesirable tendencies that the viscosity of the ink is increased and the ejection stability becomes bad. In addition, the particle sizes of the colorant are preferably not larger than 400 nm and more preferably not larger than 200 nm.

(Inks of the Ink Jet Recording Ink Set)

The ink of the ink jet recording ink set of the invention contains a substance making the surface tension of the ink 40 mN/m or lower and glycerol, wherein the substance making the surface tension 40 mN/m or lower comprise at least one member selected from acetylene glycol-based surface active agents and/or acetylene alcohol-based surface active agents, and glycol ethers and/or 1,2-alkylene glycols.

The ink composition containing: at least the colorant enclosing a coloring material with the polymer having a crosslinked structure; at least one kind of compound selected from the group consisting of the acetylene glycol-based surface active agents and/or the acetylene alcohol surface active agents, glycol ethers (diethylene glycol monobutyl ether, triethylene glycol monobutyl ether, propylene glycol monobutyl ether, dipropylene glycol monobutyl ether, etc.) and/or 1,2-alkylene glycols; and water is excellent in the dispersion stability and the ejection stability, does not cause clogging of nozzle for a long period of time, and can give stabilized prints.

In the case of using the acetylene alcohol-based surface active agent, a dissolution aid can be used in combination. As the dissolution aid, there are preferably 1,3-dimethyl-2-imidazolidinone, N-methyl-2-pyrrolidone, and 2-pyrrolidone.

Furthermore, high-quality images excellent in the color developing property, which has a good drying property after printing, does not cause bleeding, and has a high printing density on a recording medium such as a plain paper, a recycled paper, a coated paper, a glazed paper, etc., can be obtained. Also, the fixing property and the difference of the glossy feeling by color and density on an exclusive paper are considerably improved.

In general, in the case of dispersing a pigment, a dispersing agent such as a surface active agent and a polymeric dispersing agent is used, but since such a dispersing agent is only adsorbed on a coloring material, usually, by a environmental factor, the dispersing agent is liable to be released from the surface of the coloring material.

On the other hand, in the invention, as described above, it is considered that by enclosing the coloring material with the polymer having a crosslinked structure, the polymer enclosing the coloring material is strongly fixed to the coloring material, the polymer is hard to be released from the coloring material.

The above-described point is explained in detail. In an ink wherein a pigment dispersion dispersing a pigment using a dispersing agent such as a surface active agent, a polymeric dispersing agent, etc., is used and the permeability is improved by a penetrating agent such as an acetylene glycol-based surface active agent, an acetylene alcohol surface active agent, glycol ethers (such as diethylene glycol monobutyl ether, triethylene glycol monobutyl ether, propylene glycol monobutyl ether, dipropylene glycol monobutyl ether, etc.), a 1,2-alkylene glycol, etc., by a strong shearing force applied in the case of ejected through a fine nozzle, there is a tendency that the dispersing agent is easily released from the surface of the pigment to deteriorate and the ejection becomes unstable.

On the other hand, in the ink using the colorant in the invention, such a phenomenon does not occur and ink is stably ejected for a long period of time. Also, since by enclosing the coloring material with the polymer having a crosslinked structure, the polymer enclosing the coloring material is more strongly fixed to the coloring material and is hard to be released from the coloring material, and the polymer has the crosslinked structure, a good solvent resistance is obtained, whereby the acceleration of the release of the polymer from the coloring material and swelling of the polymer by the above-described penetrating agent are hard to occur. Accordingly, the working effect of excellent in the dispersion stability is obtained for a long period of time.

Also, in an ink wherein a pigment dispersion having a dispersed pigment using a dispersing agent such as a surface active agent or a polymeric dispersing agent, etc., is used and the permeability is improved, in general, there is a tendency of increasing the viscosity of the ink by the dispersion, which is dissolved in the liquid without being adsorbed on the surface of the pigment from the beginning of dispersing and the dispersing agent released from the pigment thereafter, thereby the content of the pigment is frequently restricted. Therefore, in a plain paper and a recycled paper, it frequently happens that a sufficient printing density cannot be obtained and good color development is not obtained.

On the other hand, as described above, in the colorant in the invention, since by enclosing a coloring material with the polymer having a crosslinked structure, the polymer enclosing the coloring material is more strongly fixed to the coloring material, the polymer is hard to be released from the coloring material, and thus the viscosity of the ink is not increased and lowering of the viscosity of the ink is easy, whereby the ink has the advantage that more colorant can contain, and thus a sufficient printing density can be obtained on a plain paper and a recycled paper. Also, since the polymer enclosing the pigment is more strongly fixed to the coloring material, fixing in an exclusive paper is very good, about the difference of the glossy feeling originated in the coloring material, ununiform feeling does not occur and a good impression can be given.

The above-described reason is used for explaining the content of the invention to the utmost and the scope of the invention is not limited by the reason only.

When the above-described 1,2-alkylene glycol is 1,2-pentanediol (1,2-PD) and/or 1,2-hexanediol (1,2-HD) and the addition amount of the above described acetylene glycol-based surface active agent and/or the acetylene alcohol-based surface active agent is at least 0.5%, the ink jet recording ink set of the invention has a feature that the ratio the surface active agent to the above-described 1,2-alkylene glycol is from 1:0 to 1:10.

The 1,2-alkylene glycol, which gives a high effect by using as it is, is 1,2-pentanediol and/or 1,2-hexanediol. The addition amount of 1,2-pentanediol is preferably from 3 to 15%. When the addition amount is less than 3%, the effect of improving the permeability of the ink is low, and when the carbon number exceeds 15, the compound is reluctant to use for the water-soluble ink as in the invention since the water-solubility of the compound is low. The addition amount of 1,2-hexanediol is preferably from 0.5 to 10%. When the addition amount is less than 0.5%, the effect of improving the permeability of the ink is low, and when the carbon number exceeds 10, the compound is reluctant to use for the water-soluble ink as in the invention since the water-solubility of the compound is low.

Also, the ink jet recording ink of the invention has a feature that it contains from 0 to 5% by weight of an acetylene glycol surface active agent.

By adding the acetylene glycol surface active agent to the ink, the quality of the prints can be more improved. The addition amount of the surface active agent is from 0 to 5% by weight, and when the addition amount exceeds 5% by weight, the quality of the prints are not more improved corresponding to the excessive addition amount and on the contrary, an evil effect of increasing the viscosity of the ink occurs. More preferred addition amount thereof is from 0.1 to 2% by weight. As examples of the acetylene glycol-based surface active agent, there are Surfynol series of Air Products and Chemicals Inc. (U.S.A.).

Furthermore, the ink jet recording ink of the invention has a feature that it contains from 0 to 20% by weight of di(tri) ethylene glycol monobutyl ether.

From the viewpoint of improving the printing quality, it is preferred to add di(tri)ethylene glycol monobutyl ether. Di(tri)ethylene glycol monobutyl ether is useful for improving the solubility of the acetylene glycol-based surface active agent and for improving the printing quality, but when the addition amount exceeds 10 times, these effects become the peak and thus such a large amount becomes hard to be used for ink jet.

The ink jet recording inks of the invention contain, as the case may be, various additives such as a humectant, a dissolution aid, a penetration controlling agent, a viscosity controlling agent, a pH controlling agent, a dissolution aid, an antioxidant, an antifungal agent, a corrosion preventing agent, a metal salt trapping agent, etc., for the purposes of ensuring the stability of allowing to stand the ink, and attaining stable ejection of the ink from a ink ejection head, etc., and the addition of these additives is included in the invention. The examples of them are shown below.

For restraining drying of the ink at the front of a nozzle, it is preferred to add a glycol having a water solubility and examples of such a glycol include ethylene glycol, diethylene glycol, triethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,5-pentanediol, 1,6-hexanediol, glycerol, mesoerythritol, and pentaerythritol.

Also, for restraining clogging a nozzle by drying the ink at the front of the nozzle in the invention, various kinds of saccharide can be used.

As the usable saccharide, there are monosaccharides and polysaccharides, and practically, in addition of glucose, mannose, fructose, ribose, xylose, arabinose, lactose, galactose, aldonic acid, glucitose, maltose, cellobiose, sucrose, toleharose, maltotriose, etc., alginic acid and the salts thereof, cyclodextrins, and celluloses. Also, the addition amount thereof is preferably at least 0.05% and not more than 30%. When the addition amount is less than 0.05%, the effect of recovering the phenomenon of clogging a nozzle by drying the ink at the tip of the nozzle head is less, while the addition amount exceeds 30%, the viscosity of the ink is increased and proper printing cannot be carried out.

The more preferred addition amount of glucose, mannose, fructose, ribose, xylose, arabinose, lactose, galactose, aldonic acid, glucitose, maltose, cellobiose, sucrose, toleharose, maltotriose, etc., as monosaccharides and polysaccharide, which are general saccharide, is from 3 to 20%. It is necessary that the addition amount of alginic acid and the salts thereof, cyclodextrins, and celluloses is an extent that the viscosity of the ink added does not become too high.

As other additives, there are glycol ethers having a compatibility with water and having a low solubility in water contained in the ink, and compounds, which can be used for improving the solubility of the ink components, and further improving the permeability of the ink to a recording medium (for example, papers), or for preventing clogging of nozzle. These additives include alkyl alcohols having from 1 to 4 carbon atoms, such as ethanol, methanol, butanol, propanol, isopropanol, etc.; glycol ethers such as ethylene glycol methyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol, mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, dipropylene glycol mono-n-butyl ether, etc.; and formamide, acetamide, dimethyl sulfoxide, sorbitol, sorbitan, acetin, diacetin, triacetin, sulfolane, etc. They can be appropriately selected and used.

Also, the ink in the invention can further contain other surface active agent for controlling the permeability. As the surface active agent added for the purpose, a surface active agent having a good compatibility with the inks shown in the examples of the invention is preferred and in these surface active agents, a surface active agent having a high permeability and a good stability is preferred. As the examples, there are amphoteric surface active agents, nonionic surface active agents, etc.

The amphoteric surface active agents used in the invention include lauryldimethylaminoacetic acid betain, 2-alkyl-N-carboxymethyl-N-hydroxyethyl imidazolinium betain, coconut oil fatty acid amidopropyldimethylaminoacetuc acid betain, polyoctyl polyaminoethyl glycine, imidazoline derivatives, etc. The nonionic surface active agents used in the invention include ether-based surface active agents such as polyoxyethylene nonylphenyl ether, polyoxyethylene octylphenyl ether, polyoxyethylene dodecylphenyl ether, polyoxyethylene alkyl allyl ether, polyoxyethylene oleyl ether, polyoxyethylene lauryl ether, polyoxyethylene alkyl ether, polyoxyalkylene alkyl ether, etc.; ester-based surface active agents such as polyoxyethylene oleic acid, polyoxyethylene oleic acid ester, polyoxyethylene distaric acid ester, sorbitan laurate, sorbitan monostearate, sorbitan monooleate, sorbitan sesquioleate, polyoxyethylene monooleate, polyoxyethylene stearate, etc.; and fluorine-based surface active agents such as a fluorine alkyl ester, perfluoroalkyl carbonate, etc.

Also, as a pH controlling agent, a dissolution aid, or an antioxidant, there are amines such as diethanolamine, triethanolamine, propanolamine, morpholine, etc., and the modified products of them; inorganic salts such as potassium hydroxide, sodium hydroxide, lithium hydroxide, etc.; ammonium hydroxide, quaternary ammonium hydroxides (tetramethylammonium, etc.); carbonates such as potassium carbonate, sodium carbonate, lithium carbonate, etc.; or 1,3-dimethyl-2-imidazolidinone, N-methyl-2-pyrrolidone; ureas such as urea, thiourea, tetramethylurea, etc.; allophanates such as allophanate, methyl allophanate, etc.; biurets such as biuret, dimethyl biuret, etc.; and L-ascorbic acid and the salts thereof, etc.

Also, commercially available antioxidants, ultraviolet absorbents, etc., can be used. The examples thereof include Tinuvin 328, 900, 1130, 384, 292, 123, 144, 622, and 770; and Irganox 1010, 1076, and 1035; MD1024, etc., manufactured by Ciba-Geigy Corporation, and the oxides of lanthanide.

Furthermore, the viscosity controlling agents used in the invention include rosins, alginic acids, polyvinyl alcohol, hydroxypropyl cellulose, carboxymethyl cellulose, hydroxyethyl cellulose methyl cellulose, polyacrylates, polyvinyl pyrrolidone, gum arabic, starch, etc.

EXAMPLES

The present invention will be illustrated in greater detail with reference to the following Examples, but the invention should not be construed as being limited thereto.
(Production Examples of Colorant Enclosing Coloring Material With Polymer Having Crosslinked Structure)

Production Example 1
(1-1) Synthesis of Polymer Having Crosslinking Reactive Group and Hydrophilic Group:

A mixed liquid composed of 84 parts by weight of benzyl methacrylate, 85 parts by weight of n-butyl acrylate, 35 parts by weight of 2-hydroxyethyl methacrylate, 25 parts by weight of methacrylic acid, 13 parts by weight of glycidyl methacrylate, and 20.0 parts by weight of t-hexylperoxy-2-ethylhexanate was prepared. Then, 300 parts by weight of methyl ethyl ketone was charged in a reaction vessel and after raising the temperature to 75° C. with stirring under a nitrogen seal, the above-described mixed liquid was added dropwise thereto over a period of 2 hours. After finishing the addition, the reaction was further carried out for 20 hours at the same temperature and thereafter, methyl ethyl ketone was distilled off to obtain a polymer.

As the result of GPC, the weight average molecular weight of the polymer was about 13000.
(1-2) Colorant 1-A:
Production of Colorant Enclosing Carbon Black With Polymer Having Crosslinked Structure:

50 parts by weight of toluene was added to 6 parts by weight of the polymer obtained in the above-described (1-1) to dissolve the polymer therein, and 20 parts by weight of carbon black (Raven C: manufactured by Columbia Ribbon & Carbon Mfg. Co., Inc.) was added thereto. After dispersing it using a bead mill dispersing apparatus, the beads used were removed by filtration to obtain a liquid, and further 0.3 part by weight of para-methanediamine was added to the liquid obtained, followed by carrying out mixing and dissolution using a mixer. Then, while carrying out stirring and the irradiation of ultrasonic waves, 60 parts by weight of ion-exchanged water was added dropwise to the organic solvent phase followed by carrying out an emulsification. After completely removing toluene from the emulsion at 60° C. under a reduced pressure, a crosslinking reaction was carried out at 80° C. over a period of 5 hours. Thereafter, the pH was adjusted to about 8 with potassium hydroxide, and the reaction mixture was passed through a filter of 0.4 μm to obtain a dispersion of the desired colorant.

Measuring the particle sizes by Micro Track D. H. S. DPA (manufactured by MOONTECH Corporation), the mean particle size was found to be 180 nm. In addition, the solid component concentration was 30.5%.
(1-3) Colorant 1-B
Production of Colorant Enclosing Yellow Pigment With Polymer Having Crosslinked Structure 100 parts by weight of toluene was added to 30 parts by weight of the polymer obtained by the above-described (1-1) to dissolve the polymer therein, and 20 parts by weight of C.I. Pigment Yellow 180 (manufactured by Clariant K. K.) was added thereto. After dispersing the mixture using a bead mill dispersing apparatus, the beads used were removed by filtration to provide a liquid, and further 1.5 parts by weight of para-methanediamine was added to the liquid followed carrying out mixing and dissolution using a mixer. Then, while carrying out stirring and the irradiation of ultrasonic waves, 100 parts by weight of ion-exchanged water was added dropwise to the organic solvent phase followed by carrying out an emulsification. After completely removing toluene from the emulsion at 60° C. under a reduced pressure, the crosslinking reaction was carried out at 80° C. over a period of 5 hours. Thereafter, the pH was adjusted to about 8 with potassium hydroxide, and the reaction mixture was passed through a filter of 0.4 μm to obtain a dispersion of the desired colorant. Measuring the particle sizes by Micro Track D. H. S. DPA (manufactured by MOONTECH Corporation), the mean particle size was found to be 180 nm. In addition, the solid component concentration was 34%.

Using a part of the above-described dispersion, the liquid phase was separated from the colorant by a centrifugal separator, and as the result of analyzing the liquid phase by GPC, the amount of water-soluble substances originated in the polymer was 600 ppm.

(1-4) Colorant 1-C
Production of Colorant Enclosing Magenta Pigment With Polymer Having Crosslinked Structure 100 parts by weight of toluene was added to 30 parts by weight of the polymer obtained by the above-described (1-1), and 20 parts by weight of C.I. Pigment Red 122 (manufactured by Clariant K. K.) was added thereto. After dispersing the mixture using a bead mill dispersing apparatus, the beads used were removed by filtration to provide a liquid, and further 1.5 parts by weight of para-methanediamine was added to the liquid, followed by carrying out mixing and dissolution using a mixer. Then, while carrying out stirring and the irradiation of ultrasonic waves, 100 parts by weight of ion-exchanged water was added dropwise to the organic solvent phase followed by carrying out an emulsification. After completely removing toluene from the emulsion at 60° C. under a reduced pressure, the crosslinking reaction was carried out at 80° C. over a period of 5 hours. Thereafter, the pH was adjusted to about 8 with potassium hydroxide, and the reaction mixture was passed through a filter of 0.4 μm to obtain a dispersion of the desired colorant. Measuring the particle sizes by Micro Track D. H. S. DPA (manufactured by MOONTECH Corporation), the mean particle size was found to be 150 nm. In addition, the solid component concentration was 34%.

Using a part of the above-described dispersion, the liquid phase was separated from the colorant by a centrifugal separator, and as the result of analyzing the liquid phase by GPC, the amount of water-soluble substances originated in the polymer was 600 ppm.

(1-5) Colorant 1-D:
Production of Colorant Enclosing Cyan Pigment With Polymer Having Crosslinked Structure:

50 parts by weight of toluene was added to 6 parts by weight of the polymer obtained by the above-described (1-1), and 20 parts by weight of C.I. Pigment Blue 15:3 (manufactured by Clariant K. K.) was added thereto. After dispersing the mixture using a bead mill dispersing apparatus, the beads used were removed by filtration to provide a liquid, and further 0.3 part by weight of para-methanediamine was added to the liquid, followed by carrying out mixing and dissolution using a mixer. Then, while carrying out stirring and the irradiation of ultrasonic waves, 60 parts by weight of ion-exchanged water was added dropwise to the organic solvent phase followed by carrying out an emulsification. After completely removing toluene from the emulsion at 60° C. under a reduced pressure, the crosslinking reaction was carried out at 80° C. over a period of 5 hours. Thereafter, the pH was adjusted to about 8 with potassium hydroxide, and the reaction mixture was passed through a filter of 0.4 μm to obtain a dispersion of the desired colorant.

Measuring the particle sizes by Micro Track D. H. S. DPA (manufactured by MOONTECH Corporation), the mean particle size was found to be 180 nm. In addition, the solid component concentration was 30.5%.

Production Example 2
(2-1) Synthesis of Polymer Having Crosslinking Reactive Group and Hydrophilic Group:

A mixed liquid composed of 84 parts by weight of benzyl methacrylate, 85 parts by weight of n-butyl acrylate, 35 parts by weight of 2-hydroxyethyl methacrylate, 25 parts by weight of methacrylic acid, and 20.0 parts by weight of t-hexylperoxy-2-ethylhexanate was prepared. Then, 300 parts by weight of methyl ethyl ketone was charged in a reaction vessel and after raising the temperature to 75° C. with stirring under a nitrogen seal, the above-described mixed liquid was added dropwise thereto over a period of 2 hours. After finishing the addition, the reaction was further carried out for 20 hours at the same temperature to obtain a solution of a polymer having a number average molecular weight of 13,000. To the polymer solution were added 5 parts by weight of 2-methacryloyloxyethyl isocyanate (Karenz MOI, manufactured by SHOWA DENKO K. K.), 0.1 part by weight of dibutyltin laurate, and further 200 ppm of hydroquinone, and the reaction was carried out at 70° C. for 5 hours by heating again to obtain a solution of a polymer having an unsaturated hydrocarbon group as a crosslinking reactive group.

(2-2) Colorant 2-A
Production of Colorant Enclosing Carbon Black With Polymer Having Crosslinked Structure:

30 parts by weight of toluene was added to 6 parts by weight of the polymer obtained in the above-described (2-1) to dissolve the polymer therein, and 20 parts by weight of carbon black (Raven C: manufactured by Columbia Ribbon & Carbon Mfg. Co., Inc.) was added thereto. After dispersing it using a bead mill dispersing apparatus, the beads used were removed by filtration to obtain a liquid, and further 0.3 part by weight of diethylene glycol was added to the liquid obtained, followed by mixing and dissolution using a mixer. Then, while applying stirring and the irradiation of ultrasonic waves, 60 parts by weight of ion-exchanged water having dissolved therein 1% by weight of potassium persulfate as a polymerization initiator was added dropwise to the organic solvent phase followed by carrying out an emulsification. The emulsion was subjected to a crosslinking reaction at 75° C. for 10 hours and toluene was completely removed from the emulsion at 60° C. under a reduced pressure. Thereafter, the pH was adjusted to about 8 with potassium hydroxide, and the reaction mixture was passed through a filter of 0.4 μm to obtain a dispersion of the desired colorant.

Measuring the particle sizes by Micro Track D. H. S. DPA (manufactured by MOONTECH Corporation), the mean particle size was found to be 180 nm. In addition, the solid component concentration was 30.5%.

(2-3) Colorant 2-B
Production of Colorant Enclosing Yellow Pigment With Polymer Having Crosslinked Structure:

50 parts by weight of toluene was added to 30 parts by weight of the polymer obtained by the above-described (2-1) to dissolve the polymer therein, and 20 parts by weight of C.I. Pigment Yellow 150 was added thereto. After dispersing the mixture using a bead mill dispersing apparatus, the beads used were removed by filtration to provide a liquid, and further 0.3 parts by weight of diethylene glycol was added to the liquid, followed by carrying out mixing and dissolution using a mixer. Then, while applying stirring and the irradiation of ultrasonic waves, 60 parts by weight of ion-exchanged water having dissolved therein 1% by weight of potassium persulfate as a polymerization initiator was added dropwise to the organic solvent phase followed by carrying out an emulsification. The emulsion was subjected to a crosslinking reaction at 75° C. for 10 hours and toluene was completely removed from the emulsion at 60° C. under a reduced pressure. Thereafter, the pH was adjusted to about 8 with potassium hydroxide, and the reaction mixture was passed through a filter of 0.4 μm to obtain a dispersion of the desired colorant.

Measuring the particle sizes by Micro Track D. H. S. DPA (manufactured by MOONTECH Corporation), the mean particle size was found to be 180 nm. In addition, the solid component concentration was 30.5%.

(2-4) Colorant 2-C
Production of Colorant Enclosing Magenta Pigment With Polymer Having Crosslinked Structure:

50 parts by weight of toluene was added to 30 parts by weight of the polymer obtained by the above-described (2-1) to dissolve the polymer therein, and 20 parts by weight of C.I. Pigment Red 122 was added thereto. After dispersing the mixture using a bead mill dispersing apparatus, the beads used were removed by filtration to provide a liquid, and further 0.3 part by weight of diethylene glycol dimethacrylate was added to the liquid, followed by carrying out mixing and dissolution using a mixer. Then, while applying stirring and the irradiation of ultrasonic waves, 60 parts by weight of ion-exchanged water having dissolved therein 1% by weight of potassium persulfate as a polymerization initiator was added dropwise to the organic solvent phase followed by carrying out an emulsification. The emulsion was subjected to a crosslinking reaction at 75° C. for 10 hours and toluene was completely removed from the emulsion at 60° C. under a reduced pressure. Thereafter, the pH was adjusted to about 8 with potassium hydroxide, and the reaction mixture was passed through a filter of 0.4 $\mu$m to obtain a dispersion of the desired colorant.

Measuring the particle sizes by Micro Track D. H. S. DPA (manufactured by MOONTECH Corporation), the mean particle size was found to be 180 nm. In addition, the solid component concentration was 30.5%.

(2-5) Colorant 2-D
Production of Colorant Enclosing Cyan Pigment With Polymer Having Crosslinked Structure:

50 parts by weight of toluene was added to 30 parts by weight of the polymer obtained by the above-described (2-1) to dissolve the polymer therein, and 20 parts by weight of C.I. Pigment Blue 15:3 was added thereto. After dispersing the mixture using a bead mill dispersing apparatus, the beads used were removed by filtration to provide a liquid, and further 30 parts by weight of diethylene glycol dimethacrylate was added to the liquid, followed by carrying out mixing and dissolution using a mixer. Then, while applying stirring and the irradiation of ultrasonic waves, 60 parts by weight of ion-exchanged water having dissolved therein 1% by weight of potassium persulfate as a polymerization initiator was added dropwise to the organic solvent phase followed by carrying out an emulsification. The emulsion was subjected to a crosslinking reaction at 75° C. for 10 hours and toluene was completely removed from the emulsion at 60° C. under a reduced pressure. Thereafter, the pH was adjusted to about 8 with potassium hydroxide, and the reaction mixture was passed through a filter of 0.4 $\mu$m to obtain a dispersion of the desired colorant.

Measuring the particle sizes were measured by Micro Track D. H. S. DPA (manufactured by MOONTECH Corporation), the mean particle size was found to be 160 nm.

Production Example 3

In a preferred embodiment of the invention, each of the colorants in the invention is obtained by dispersing well the pigment in an aqueous organic solvent and/or water using a dispersing agent having a polymerizable group and thereafter, carrying out the polymerization reaction of the dispersion together with the dispersing agent having a polymerizable group and a crosslinkable monomer under the existence of a polymerization initiator in a reaction vessel equipped with a stirrer, a thermometer, a temperature controller, a reflux condenser and a dropping funnel.

In the production example 3, "colorants each enclosing a coloring material with a polymer having a crosslinked structure" were obtained by the following production methods.

(3-1) Colorant 3-A
Production of Colorant Enclosing Carbon Black With Polymer Having Crosslinked Structure:

The colorant 3-A was prepared by the method according to Example 1 described in Japanese Patent Laid-Open No. 316909/1998. That is, in a reaction vessel equipped with a ultrasonic generator, a stirrer, a temperature controller, a reflux condenser and a dropping funnel, 50 parts by weight of carbon black (Raven C: manufactured by Columbia Ribbon & Carbon Mfg. Co., Inc.) and 30 parts by weight of a polymerizable surface active agent SE-10N shown by the formula (I) (manufactured by ASAHI DENKA KOGYO K. K.) were added into 800 parts by weight of water, and they were dispersed by applying ultrasonic waves for 4 hours. Then, 16 parts by weight of acrylonitrile, 2.4 parts by weight of divinylbenzene, and 0.5 part by weight of potassium persulfate were further added thereto and a polymerization reaction was carried out at 60° C. for 48 hours. Thereafter, the pH was adjusted to about 8 with potassium hydroxide and the reaction mixture was filtered by a filter of 0.4 $\mu$m to remove coarse particles, whereby the desired colorant was obtained in the form of a dispersion.

(3-2) Colorant 3-B:
Production of Colorant Enclosing Yellow Pigment With Polymer Having Crosslinked Structure:

By following the same procedure as above except for using a polymerizable surface active agent Aquaron HS-10 shown by the formula (II) in place of the polymerizable surface active agent Adekarea Soap SE-10N (manufactured by ASAHI DENKA KOGYO K. K.) shown by the formula (I) used in the above-described (3-1) and using C.I. Pigment Yellow 128 as the coloring material, a desired colorant was obtained in the form of a dispersion.

(3-3) Colorant 3-C
Production of Colorant Enclosing Magenta Pigment With Polymer Having Crosslinked Structure:

By following the same procedure as the production of the above-described (3-1) except that C.I. Pigment Red 122 was used as the coloring material, a desired colorant was obtained in the form of a dispersion.

(3-4) Colorant 3-D
Production of Colorant Enclosing Cyan Pigment With Polymer Having Crosslinked Structure:

By following the same procedure as the production of the above-described (3-1) except that C.I. Pigment Blue 15:3 was used as the coloring material, a desired colorant was obtained in the form of dispersion.

(3-5): Colorant 3-E
Production of Colorant Enclosing Orange Pigment With Polymer Having Crosslinked Structure:

In a reaction vessel equipped with a ultrasonic generator, a stirrer, a temperature controller, a reflux condenser and a dropping funnel, 50 parts by weight of C.I. Pigment Orange 36 and 30 parts by weight of a polymerizable surface active agent SE-10N shown by the formula (I) (manufactured by ASAHI DENKA KOGYO K. K.) were added into 800 parts by weight of water, and they were dispersed by applying ultrasonic waves for 4 hours. Then, 16 parts by weight of acrylonitrile, 5 parts by weight of diallyl isocyanate, and 0.5 part by weight of potassium persulfate were further added thereto and a polymerization reaction was carried out at 60° C. for 48 hours. Thereafter, the pH was adjusted to about 8 with potassium hydroxide and the reaction mixture was filtered by a filter of 0.4 μm to remove coarse particles, whereby a desired colorant was obtained in the form of dispersion.

(3-6) Colorant F
Production of Colorant Enclosing Green Pigment With Polymer Having Crosslinked Structure:

In a reaction vessel equipped with a ultrasonic generator, a stirrer, a temperature controller, a reflux condenser and a dropping funnel, 50 parts by weight of C.I. Pigment Green 36 and 30 parts by weight of a polymerizable surface active agent SE-10N shown by the formula (I) (manufactured by ASAHI DENKA KOGYO K. K.) were added into 800 parts by weight of water, and they were dispersed by applying ultrasonic waves for 4 hours. Then, 16 parts by weight of 2-acrylamide-2-methylpropane sulfonic acid, 3 parts by weight of acrylonitrile, 5 parts by weight of divinylbenzene, and 0.5 part by weight of potassium persulfate were further added to the dispersion and a polymerization reaction was carried out at 60° C. for 48 hours. Thereafter, the pH was adjusted to about 8 with potassium hydroxide and the reaction mixture was filtered by a filter of 0.4 μm to remove coarse particles, whereby a desired colorant was obtained in the form of dispersion.

(Production Examples of Colorants Enclosing Coloring Material With Polymer (Copolymer) of Dispersing Agent Having Polymerizable Group and Monomer (Copolymerizable Monomer))

Production Example 4

Example 4 includes production examples of producing colorants each enclosing a pigment with a polymer without having a crosslinked structure (a polymer (copolymer) of a dispersing agent having a polymerizable group and a monomer (copolymerizable monomer)).

That is, the colorant is obtained by dispersing well the pigment in an aqueous organic solvent and/or water using the dispersing agent having a polymerizable group and thereafter, carrying out the polymerization reaction of the dispersion together with the dispersing agent having a polymerizable group alone or with other copolymerizable monomer under the existence of a polymerization initiator in a reaction vessel equipped with a stirrer, a thermometer, a temperature controller, a reflux condenser and a dropping apparatus at a definite reaction temperature for a definite reaction time.

The mean particle size of each colorant was measured by the laser Doppler system, particle distribution measurement machine, Microtrac UPA 150, manufactured by Leeds & Northrup Co. Also, the glass transition temperature of the polymer of the colorant was measured by a heat scanning type calorimeter (differential scanning calorimeter: DSC) manufactured by Seiko Denshi K. K., and obtained by the above-described method.

(4-1) Colorant 4-A
Production of Black Colorant

The colorant 4-A was produced by the method same as Example 1 of Japanese Patent Laid-Open No. 316909/1998. That is, 100 parts by weight of carbon black (Raven C: manufactured by Columbia Ribbon & Carbon Mfg. Co., Inc.) and 60 parts by weight of the polymerizable surface active agent, Adekarea Soap SE-10N shown by the formula (IV) manufactured by ASAHI DENKA KOGYO K. K.) were added into 250 parts by weight of water followed by irradiating ultrasonic waves, and the mixture was further subjected to a dispersing treatment by a sand mill (manufactured by Yasukawa Seisakusho K. K.) for about 2 hours. This carbon black was dispersed with the polymerizable surface-active agent, and the dispersion thus obtained was placed in a reaction vessel equipped with a ultrasonic generator, a stirrer, a temperature controller, a reflux condenser and a dropping funnel. Then, an emulsion was previously prepared by mixing 30 parts by weight of acrylonitrile, 9 parts by weight of styrene, 51 parts by weight of n-butyl acrylate, 10 parts by weight of methacrylic acid, 10 parts by weight of the above-described polymerizable surface active agent, 1 part by weight of potassium persulfate and 100 parts by weight of water, and the emulsion was gradually added dropwise to the reaction vessel using the dropping funnel. After finishing the addition, the polymerization reaction was carried out at 60° C. for 48 hours. The dispersion of the colorant obtained was neutralized with potassium hydroxide to adjust the pH to about 8 and the dispersion was filtered with the filter of 0.4 μm to remove coarse particles, whereby a dispersion of a desired colorant 4-A was obtained.

Measuring the mean particle size of the colorant by the laser Doppler system, particle measurement machine, Microtrac UPA 150 (manufactured by Leeds & Northrup Co.), the mean particle size was found to be 105 nm. Also, measuring the glass transition temperature of the colorant 4-A by a heat scanning type calorimeter (differential scanning calorimeter: DSC 200) manufactured by Seiko Denshi K. K., the glass transition temperature of the colorant was found to be 10° C.

(4-2) Colorant 4-B
Production of Yellow Colorant

By the same manner as the case of producing the colorant 4-A except that C.I. Pigment Yellow 180 (diketopyrrolopyrrole: manufactured by Clariant Co.) was used in place of the carbon black pigment, a dispersion of a desired colorant 4-B was obtained.

Measuring the mean particle size of the colorant by the laser Doppler system, particle measurement machine, Microtrac UPA 150 (manufactured by Leeds & Northrup Co.), the mean particle size was found to be 80 nm. Also, measuring the glass transition temperature of the colorant 4-B by a heat scanning type calorimeter (differential scanning calorimeter: DSC 200) manufactured by Seiko Denshi K. K., the glass transition temperature of the colorant was found to be 10° C.

(4-3) Colorant 4-C
Production of Magenta Colorant

By the same manner as the case of producing the colorant 4-A except that C.I. Pigment Red 122 (dimethyl quinacridone pigment: manufactured by Clariant Co.) was used in place of the carbon black pigment, a dispersion of a desired colorant 4-C was obtained.

Measuring the mean particle size of the colorant by the laser Doppler system, particle measurement machine, Microtrac UPA 150 (manufactured by Leeds & Northrup Co.), the mean particle size was found to be 90 nm. Also, measuring the glass transition temperature of the colorant 4-C by a heat scanning type calorimeter (differential scanning calorimeter: DSC 200) manufactured by Seiko Denshi K. K., the glass transition temperature of the colorant was found to be 10° C.

(4-4) Colorant 4-D
Production of Cyan Colorant

By the same manner as the case of producing the colorant 4-A except that C.I. Pigment Blue 15:3 (copper phthalocyanine pigment: manufactured by Clariant Co.) was used in place of the carbon black pigment, a dispersion of a desired colorant 4-D was obtained.

Measuring the mean particle size of the colorant by the laser Doppler system, particle measurement machine, Microtrac UPA 150 (manufactured by Leeds & Northrup Co.), the mean particle size was found to be 85 nm. Also, measuring the glass transition temperature of the colorant 4-D by a heat scanning type calorimeter (differential scanning calorimeter: DSC 200) manufactured by Seiko Denshi K. K., the glass transition temperature of the colorant was found to be 10° C.

(Preparations of the Inks of Examples 1 to 3 of the Invention and the Ink of Comparative Example 1)

Each of the inks having the compositions shown in Table 1 to Table 3 below was prepared by the following methods.

An aqueous medium not including the colorant obtained as described above was previously prepared, and the aqueous medium was gradually added dropwise to the dispersion of the colorant obtained as described above in a stirred state, followed by sufficiently stirring. The mixture was filtered by a membrane filter of 5 μm to obtain each ink.

In Table 1 to Table 3 described below, Olfin E1010 (manufactured by Nisshin Kagaku Kogyo K. K.) is an acetylene glycol-based surface active agent. Also, in the tables, Bk represents black, Y: yellow, M: magenta, C: cyan, Or: orange, and Gr: green.

TABLE 1

|  | Example 1 | | | | Example 2 | | | |
| --- | --- | --- | --- | --- | --- | --- | --- | --- |
|  | Bk | Y | M | C | Bk | Y | M | C |
| Colorant 1-A | 5.0 | | | | | | | |
| Colorant 1-B |  | 5.0 | | | | | | |
| Colorant 1-C |  | | 5.0 | | | | | |
| Colorant 1-D |  | | | 5.0 | | | | |
| Colorant 2-A |  | | | | 5.0 | | | |
| Colorant 2-B |  | | | | | 5.0 | | |
| Colorant 2-C |  | | | | | | 5.0 | |
| Colorant 2-D |  | | | | | | | 5.0 |
| Olfin E1010 | 1.0 | 1.0 | 1.0 | 1.0 | | | | |
| Diethylene glycol monobutyl ether | 5.0 | 5.0 | 5.0 | 5.0 | | | | |
| Triethylene glycol monobutyl ether | | | | | 5.0 | 5.0 | 5.0 | 5.0 |
| Propylene glycol monobutyl ether | | | | | | | | |
| Dipropylene glycol monobutyl ether | | | | | 2.0 | 2.0 | 2.0 | 2.0 |
| 1,2-Pentanediol | 5.0 | 5.0 | 5.0 | 5.0 | | | | |
| 1,2-Hexanediol | | | | | 5.0 | 5.0 | 5.0 | 5.0 |
| Glycerol | 10.0 | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 | 0.5 |
| Potassium hydroxide | 0.1 | 0.1 | 0.1 | 0.1 | | | | |
| Ion exchanged water | bal. | bal. | bal. | bal. | bal. | bal. | bal. | bal. |

TABLE 2

|  | Example 3 | | | | | |
| --- | --- | --- | --- | --- | --- | --- |
|  | Bk | Y | M | C | Or | Gr |
| Colorant 3-A | 8.0 | | | | | |
| Colorant 3-B |  | 8.0 | | | | |
| Colorant 3-C |  | | 8.0 | | | |
| Colorant 3-D |  | | | 8.0 | | |
| Colorant 3-E |  | | | | 8.0 | |
| Colorant 3-F |  | | | | | 8.0 |
| Olfin E1010 | 1.0 | 1.0 | 1.0 | 1.0 | 1.0 | 1.0 |
| Diethylene glycol monobutyl ether | 5.0 | 5.0 | 5.0 | 5.0 | 5.0 | 5.0 |
| Triethylene glycol monobutyl ether | | | | | | |
| Propylene glycol monobutyl ether | 2.0 | 2.0 | 2.0 | 2.0 | 2.0 | 2.0 |
| Dipropylene glycol monobutyl ether | | | | | | |
| 1,2-Pentanediol | | | | | | |
| 1,2-Hexanediol | 5.0 | 5.0 | 5.0 | 5.0 | 5.0 | 5.0 |
| Glycerol | 10.0 | 10.0 | 10.0 | 10.0 | 10.0 | 10.0 |
| Triethanolamine | 0.5 | 0.5 | 0.5 | 0.5 | 0.5 | 0.5 |
| Potassium hydroxide | 0.1 | 0.1 | 0.1 | 0.1 | 0.1 | 0.1 |
| Ion exchanged water | bal. | bal. | bal. | bal. | bal. | bal. |

TABLE 3

|  | Comparative Example 1 | | | | | |
| --- | --- | --- | --- | --- | --- | --- |
|  | Bk | Y | M | C | Or | Gr |
| Bk Dispersion (carbon black) | 4.0 | | | | | |
| Y Dispersion (C.I. Pigment Yellow 151) | | 4.0 | | | | |
| M Dispersion (C.I. Pigment Red 160) | | | 4.0 | | | |
| C Dispersion (C.I. Pigment Blue 60) | | | | 4.0 | | |
| Or Dispersion (C.I. Pigment Orange 20) | | | | | 4.0 | |
| Gr Dispersion (C.I. Pigment Green 8) | | | | | | 4.0 |
| Olfin E1010 | 1.0 | 1.0 | 1.0 | 1.0 | 1.0 | 1.0 |
| Diethylene glycol monobutyl ether | 5.0 | 5.0 | 5.0 | 5.0 | 5.0 | 5.0 |
| Triethylene glycol monobutyl ether | | | | | | |
| Propylene glycol monobutyl ether | | | | | | |
| Dipropylene glycol monobutyl ether | 2.0 | 2.0 | 2.0 | 2.0 | 2.0 | 2.0 |
| 1,2-Pentanediol | | | | | | |
| 1,2-Hexanediol | 5.0 | 5.0 | 5.0 | 5.0 | 5.0 | 5.0 |
| Glycerol | 10.0 | 10.0 | 10.0 | 10.0 | 10.0 | 10.0 |
| Triethanolamine | 0.5 | 0.5 | 0.5 | 0.5 | 0.5 | 0.5 |
| Potassium hydroxide | 0.1 | 0.1 | 0.1 | 0.1 | 0.1 | 0.1 |
| Ion exchanged water | bal. | bal. | bal. | bal. | bal. | bal. |

Ink Sets of Examples 1 to 3 and Ink Set of Comparative Example 1

The ink sets of Examples 1 to 3 and Comparative Example 1 each comprises a combination of "Bk, Y, M and C" or "Bk, Y, M, C, Or and Gr" shown in Tables 1 to 3 described above.

In addition, the "Bk dispersion" in Comparative Example 3 shown in Table 3 was prepared by dispersing 40% by weight of carbon black (Raven C: manufactured by Columbia Ribbon & Carbon Mfg. Co., Inc.), which is C.I. Pigment Black 7), 3% by weight of a general acrylic dispersing agent, and 20% by weight of water in a sand mill (manufactured by Yasukawa Seisakusho K. K.). About other colors, "Y dispersion", "M dispersion", "C dispersion", "Or dispersion", and "Gr dispersion" were similarly prepared. The coloring materials used are shown below.

| | |
|---|---|
| Y: | C.I. Pigment Yellow 151 |
| M: | C.I. Pigment Red 160 |
| C: | C.I. Pigment Blue 60 |
| Or: | C.I. Pigment Orange 20 |
| Gr: | C.I. Pigment Green 8 |

(Evaluation of Inks)
<Evaluation 1: Ejection Stability>

About each ink, letters were continuously printed using an ink jet printer, MJ-930C (manufactured by Seiko Epson Corporation) on a P-paper of Fuji Xerox Co., Ltd., and the states of the prints, such as a dot deletion, the displacement in the ink-landing positions, etc., were visually observed, and they were evaluated in accordance with the following criteria.

"Evaluation Criteria"

A: Even after printing 1000 prints, there are no dot deletion, no displacement in the ink-landing positions, etc.

B: After printing 100 prints, there are no dot deletion, no displacement in the ink-landing positions, etc.

C: Before printing 100 prints, the occurrences of the dot deletion and the displacement in the ink-landing positions are observed.

The results are shown in Table 4 below.
<Evaluation 2: Dispersion Stability>

Each ink was stored for one week at 60° C., the initial viscosity of ink and the viscosity of the ink after one week were measured, and the ratio of the viscosity after one week to the initial viscosity was determined. When the viscosity ratio was 1, the ink was evaluated to be stable. The results are shown in Table 4.

(Color Evaluation Tests)
<Evaluation 4: Color Developing Property of Red Color>

For printing a red color with the ink set of four colors and the ink set of six colors using PM-770C and using each ink set, a driver was prepared for the evaluation, and printing was carried out. The saturation of the red color obtained by each ink set was measured.

The evaluation was made in accordance with the criteria shown below. Also, printing was applied onto the evaluation papers shown below. The results of the evaluations are shown in Table 6.

"Evaluation Criteria"

A: Saturation is at least 80.

B: Saturation is at least 70 and lower than 80.

C: Saturation is at least 60 and lower than 70.

D: Saturation is lower than 60.

"Evaluation Papers"

Paper 1: Xerox 4024 paper (manufactured by Fuji Xerox Co., Ltd.)

Paper 2: High-quality plain paper (manufactured by Seiko Epson Corporation)

Paper 3: Photo-print paper 2

Paper 4: Super fine paper

<Evaluation 5: Color Developing Property of Green Color>

For printing a green color with the ink set of four colors and the ink set of six colors using PM-770C and using each ink set, a driver was prepared for the evaluation, and printing was carried out. The saturation of the green color obtained by each ink set was measured.

The evaluation was made in accordance with the criteria shown below. Printing was carried out using the above-described evaluation papers "Paper 1 to Paper 4". The results of the evaluation are shown in Table 6.

"Evaluation Criteria"

A: Saturation is at least 80.

B: Saturation is at least 70 and lower than 80.

TABLE 4

| | Bk | | Y | | M | | C | | Or | | Gr | |
|---|---|---|---|---|---|---|---|---|---|---|---|---|
| | E.S. | D.S. | E.S. | D.S. | E.S. | D.S. | E.S. | D.S. | E.S. | D.S. | E.S. | D.S. |
| Ex.1 | B | 1.0 | B | 1.0 | B | 1.0 | B | 1.0 | — | | — | |
| Ex.2 | B | 1.0 | B | 1.0 | B | 1.0 | B | 1.0 | — | | — | |
| Ex.3 | A | 1.0 | A | 1.0 | A | 1.0 | A | 1.0 | A | 1.0 | A | 1.0 |
| CE 1 | C | 1.8 | C | 3.1 | C | 2.0 | C | 1.3 | C | 1.5 | C | 1.3 |

In Table 4:
E.S.: Ejection stability
D.S.: Dispersion stability
Ex.: Example
CE: Comparative Example <Evaluation 3: Surface Tension>

The surface tension of each ink was measured by an automatic tensiometer, Type CBVP-Z, manufactured by Kyowa Kaimen Kagaku K. K. The results are shown in Table 5 below.

TABLE 5

| | Surface tension of ink (unit: mN/m) | | | | | |
|---|---|---|---|---|---|---|
| | Bk | Y | M | C | Or | Gr |
| Example 1 | 31.3 | 30.5 | 32.7 | 31.0 | — | — |
| Example 2 | 31.3 | 29.8 | 31.3 | 29.9 | — | — |
| Example 3 | 29.5 | 29.4 | 32.2 | 31.4 | 28.6 | 28.8 |
| C. Example 1 | 30.2 | 29.9 | 31.2 | 28.5 | 30.9 | 29.4 |

C. Example: Comparative Example

C: Saturation is at least 60 and lower than 70.

D: Saturation is lower than 60.

<Evaluation 6: Color Developing Property of Orange Color>

For printing an orange color with the ink set of four colors and the ink set of six colors using PM-770C and using each ink set, a driver was prepared for the evaluation, and printing was carried out. The saturation of the orange color obtained by each ink set was measured.

The evaluation was made in accordance with the criteria shown below. Printing was carried out using the above-described evaluation papers "Paper 1 to Paper 4". The results of the evaluation are shown in Table 6.

"Evaluation Criteria"

A: Saturation is at least 80.

B: Saturation is at least 70 and lower than 80.

C: Saturation is at least 60 and lower than 70.

D: Saturation is lower than 60.

TABLE 6

| | COLOR EVALUATION | | | | | | | | | | | |
|---|---|---|---|---|---|---|---|---|---|---|---|---|
| | Color developing property of red color | | | | Color developing property of green color | | | | Color developing property of orange color | | | |
| | Evaluation paper | | | | | | | | | | | |
| | P.1 | P.2 | P.3 | P.4 | P.1 | P.2 | P.3 | P.4 | P.1 | P.2 | P.3 | P.4 |
| Ex. 1 | B | B | A | A | B | B | A | B | B | B | A | B |
| Ex. 2 | B | B | A | A | B | B | A | B | B | B | A | B |
| Ex. 3 | B | B | A | A | B | A | A | A | B | A | A | A |
| Comp. Ex. 1 | D | D | B | C | D | D | B | C | D | D | B | C |

P.1 to P.4: Paper 1 to Paper 4

(Preparations of the Inks of Examples 4 to 6 of the Invention and the Ink of Comparative Example 2)

The inks having the compositions shown in Table 7 to Table 10 shown below were prepared by the following procedures similarly to the preparations of the inks of above-described Examples 1 to 3.

An aqueous medium not including the colorant obtained as described above was previously prepared, and the aqueous medium was gradually added dropwise to the dispersion of the colorant obtained as described above in a stirred state and the mixture was sufficiently stirred. The mixture was filtered by a membrane filter of 5 μm to obtain the each ink.

In Table 7 to Table 10 shown below, Olfin E1010 (manufactured by Nisshin Kagaku Kogyo K. K.) is an acetylene glycol-based surface active agent. Also, in the tables, Bk represents black, LBk: light black, Y: yellow, M: magenta, LM: light magenta. C: cyan, and LC: light cyan.

TABLE 7

| | Example 4 | | | | | |
|---|---|---|---|---|---|---|
| | Bk | Y | M | LM | C | LC |
| Colorant 1-A | 8.0 | | | | | |
| Colorant 1-B | | 8.0 | | | | |
| Colorant 1-C | | | 8.0 | 2.0 | | |
| Colorant 1-D | | | | | 8.0 | 2.0 |
| Olfin E1010 | 1.0 | 1.0 | 1.0 | 1.0 | 1.0 | 1.0 |
| Diethylene glycol monobutyl ether | 5.0 | 5.0 | 5.0 | 5.0 | 5.0 | 5.0 |
| Triethylene glycol monobutyl ether | | | | | | |
| Propylene glycol monobutyl ether | 2.0 | 2.0 | 2.0 | 2.0 | 2.0 | 2.0 |
| Dipropylene glycol monobutyl ether | | | | | | |
| 1,2-Pentanediol | | | | | | |
| 1,2-Hexanediol | 5.0 | 5.0 | 5.0 | 5.0 | 5.0 | 5.0 |
| Glycerol | 10.0 | 10.0 | 10.0 | 10.0 | 10.0 | 10.0 |
| Triethanolamine | 0.5 | 0.5 | 0.5 | 0.5 | 0.5 | 0.5 |
| Potassium hydroxide | 0.1 | 0.1 | 0.1 | 0.1 | 0.1 | 0.1 |
| Ion exchanged water | bal. | bal. | bal. | bal. | bal. | bal. |

TABLE 8

| | Example 5 | | | | | | |
|---|---|---|---|---|---|---|---|
| | Bk | LBk | Y | M | LM | C | LC |
| Colorant 2-A | 8.0 | 4.0 | | | | | |
| Colorant 2-B | | | 8.0 | | | | |
| Colorant 2-C | | | | 8.0 | 1.5 | | |
| Colorant 2-D | | | | | | 5.0 | 1.25 |
| Olfin E1010 | 1.0 | 1.0 | 1.0 | 1.0 | 1.0 | 1.0 | 1.0 |
| Diethylene glycol monobutyl ether | 5.0 | 5.0 | 5.0 | 5.0 | 5.0 | 5.0 | 5.0 |
| Triethylene glycol monobutyl ether | | | | | | | |
| Propylene glycol monobutyl ether | 2.0 | 2.0 | 2.0 | 2.0 | 2.0 | 2.0 | 2.0 |
| Dipropylene glycol monobutyl ether | | | | | | | |
| 1,2-Pentanediol | | | | | | | |
| 1,2-Hexanediol | 5.0 | 5.0 | 5.0 | 5.0 | 5.0 | 5.0 | 5.0 |
| Glycerol | 10.0 | 10.0 | 10.0 | 10.0 | 10.0 | 10.0 | 10.0 |
| Triethanolamine | 0.5 | 0.5 | 0.5 | 0.5 | 0.5 | 0.5 | 0.5 |
| Potassium hydroxide | 0.1 | 0.1 | 0.1 | 0.1 | 0.1 | 0.1 | 0.1 |
| Ion exchanged water | bal. | bal. | bal. | bal. | bal. | bal. | bal. |

TABLE 9

| | Example 6 | | | | | |
|---|---|---|---|---|---|---|
| | Bk | Y | N | LM | C | LC |
| Colorant 3-A | 8.0 | | | | | |
| Colorant 3-B | | 8.0 | | | | |
| Colorant 3-C | | | 8.0 | 2.0 | | |
| Colorant 3-D | | | | | 6.0 | 1.5 |
| Olfin E1010 | 1.0 | 1.0 | 1.0 | 1.0 | 1.0 | 1.0 |
| Diethylene glycol monobutyl ether | 5.0 | 5.0 | 5.0 | 5.0 | 5.0 | 5.0 |
| Triethylene glycol monobutyl ether | | | | | | |
| Propylene glycol monobutyl ether | 2.0 | 2.0 | 2.0 | 2.0 | 2.0 | 2.0 |
| Dipropylene glycol monobutyl ether | | | | | | |
| 1,2-Pentanediol | | | | | | |
| 1,2-Hexanediol | 5.0 | 5.0 | 5.0 | 5.0 | 5.0 | 5.0 |
| Glycerol | 10.0 | 10.0 | 10.0 | 10.0 | 10.0 | 10.0 |
| Triethanolamine | 0.5 | 0.5 | 0.5 | 0.5 | 0.5 | 0.5 |
| Potassium hydroxide | 0.1 | 0.1 | 0.1 | 0.1 | 0.1 | 0.1 |
| Ion exchanged water | bal. | bal. | bal. | bal. | bal. | bal. |

TABLE 10

| | Comparative Example 2 | | | | | |
|---|---|---|---|---|---|---|
| | Bk | Y | M | LM | C | LC |
| Bk Dispersion (carbon black) | 4.0 | | | | | |
| Y Dispersion (C.I. Pigment Yellow 151) | | 4.0 | | | | |

TABLE 10-continued

|  | Comparative Example 2 | | | | | |
| --- | --- | --- | --- | --- | --- | --- |
|  | Bk | Y | M | LM | C | LC |
| M Dispersion |  |  | 4.0 |  |  |  |
| (C.I. Pigment Red 160) |  |  |  |  |  |  |
| C Dispersion |  |  |  |  | 4.0 |  |
| (C.I. Pigment Blue 60) |  |  |  |  |  |  |
| Olfin E1010 | 1.0 | 1.0 | 1.0 | 1.0 | 1.0 | 1.0 |
| Diethylene glycol monobutyl ether | 5.0 | 5.0 | 5.0 | 5.0 | 5.0 | 5.0 |
| Triethylene glycol monobutyl ether |  |  |  |  |  |  |
| Propylene glycol monobutyl ether |  |  |  |  |  |  |
| Dipropylene glycol monobutyl ether | 2.0 | 2.0 | 2.0 | 2.0 | 2.0 | 2.0 |
| 1,2-Pentanediol |  |  |  |  |  |  |
| 1,2-Hexanediol | 5.0 | 5.0 | 5.0 | 5.0 | 5.0 | 5.0 |
| Glycerol | 10.0 | 10.0 | 10.0 | 10.0 | 10.0 | 10.0 |
| Triethanolamine | 0.5 | 0.5 | 0.5 | 0.5 | 0.5 | 0.5 |
| Potassium hydroxide | 0.1 | 0.1 | 0.1 | 0.1 | 0.1 | 0.1 |
| Ion exchanged water | bal. | bal. | bal. | bal. | bal. | bal. |

(Ink Sets of Examples 4 to 6 and Ink set of Comparative Example 2)

The ink sets of Examples 4 to 6 of the invention and the ink set of Comparative Example 2 comprise a combination of "Bk, Y, M, LM, C and LC" or "Bk, LBk, Y, M, LM, C and LC" as shown in Tables 7 to 10.

In addition, the "Bk dispersion" of Comparative Example 2 in Table 10 was prepared by dispersing 4.0% by weight of carbon black (Raven C: manufactured by Columbia Ribbon & Carbon Mfg. Co., Inc.), 3% by weight of a general acrylic dispersing agent, and 20% by weight of water in a sand mill (Yasukawa Seisakusho K. K.). In regard to other colors, the "Y dispersion", "M dispersion", and "C dispersion" were similarly prepared.

The Coloring Materials Used are Shown Below.
Y: C.I. Pigment Yellow 151
M: C.I. Pigment Red 160
C: C.I. Pigment Blue 60
(Evaluation of Inks)
<Evaluation 7: Ejection Stability>
<Evaluation 8: Dispersion Stability>

With respect to each of the inks of Examples 4 to 6 and Comparative Example 2, the evaluations of the "Evaluation 7: Ejection stability" and "Evaluation 8: Dispersion stability" were carried out by the same conditions as "Evaluations 1 and 2", respectively. The results are shown in Table 11.

TABLE 11

|  | Bk | | LBk | | Y | | M | | LM | | C | | LC | |
| --- | --- | --- | --- | --- | --- | --- | --- | --- | --- | --- | --- | --- | --- | --- |
|  | E.S. | D.S. | E.S. | D.S. | E.S. | D.S. | E.S. | D.S. | E.S. | D.S. | E.S. | D.S. | E.S. | D.S. |
| Ex. 4 | A | 1.0 | — |  | A | 1.0 | A | 1.0 | A | 1.0 | A | 1.0 | A | 1.0 |
| Ex. 5 | A | 1.0 | A | 1.0 | A | 1.0 | A | 1.0 | A | 1.0 | A | 1.0 | A | 1.0 |
| Ex. 6 | A | 1.0 | — |  | A | 1.0 | A | 1.0 | A | 1.0 | A | 1.0 | A | 1.0 |
| Comp. Ex. 2 | C | 1.8 | — |  | C | 3.1 | C | 2.0 | C | 1.3 | C | 1.5 | C | 1.3 |

E.S.: Ejection stability, D.S.: Dispersion stability

<Evaluation 9: Surface Tension>

The surface tension of each ink was measured by an automatic tensiometer, Type CBVP-Z, manufactured by Kyowa Kaimen Kagaku K. K. The results are shown in Table 12 below.

TABLE 12

| Surface tension of each ink (unit: mN/m) | | | | | | |
| --- | --- | --- | --- | --- | --- | --- |
|  | Bk | LBk | Y | M | LM | C | LC |
| Example 4 | 29.5 | — | 29.4 | 32.2 | 32.4 | 28.6 | 28.9 |
| Example 5 | 29.5 | 29.4 | 32.2 | 31.4 | 31.7 | 30.5 | 30.9 |
| Example 6 | 29.5 | — | 29.4 | 32.2 | 32.3 | 28.6 | 28.8 |
| Comparative Example 2 | 30.2 | — | 29.9 | 31.2 | 31.6 | 29.9 | 29.4 |

<Evaluation 10: Color Developing Property>

PM-770C was upgraded, using each ink set, an upgraded driver was prepared for the evaluation, and 100% duty of Y, M, C, R, G and Bk was printed. The saturation of each of Y, M, C, R, G and Bk obtained was measured.

The evaluation was made in accordance with the criteria shown below. Printing was carried out on the evaluation papers shown below. The results are shown in Table 13.
"Evaluation Criteria"
  A: Saturation is at least 80.
  B: Saturation is at least 70 and lower than 80.
  C: Saturation is at least 60 and lower than 70.
  D: Saturation is lower than 60.
"Evaluation Papers"
  Paper 5: Xerox 4024 paper (Fuji Xerox Co., Ltd.)
  Paper 6: High-quality plain paper (manufactured by Seiko Epson Corporation)
  Paper 7: Photo•print paper 2
  Paper 8: Super fine paper
<Evaluation 11: Fixing Property>

PM-770C was upgraded, using each ink set, gradation patterns of Y, M, C, R, G, B and Bk were printed, and the fixing property of the printed matter obtained using each ink set was evaluated. The evaluation was made in accordance with the criteria shown below. Printing was carried out using the evaluation papers shown below. The results are shown in Table 13.
"Evaluation Criteria"
  A: Fixing properties of all the colors are good.
  B: Fixing properties are somewhat insufficient in all the colors.
  C: Fixing properties are insufficient in all the colors.
"Evaluation Papers"
  Glazed paper 1: Photo•print paper 2
  Glazed paper 2: PM Photographic paper
  Glazed paper 3: Glazed film <Evaluation 12: Uniformity of Gloss (Gloss Unevenness) of Gradation Prints>

Using each ink set, gradation patters of Y, M, C, R, G, B and Bk were printed using PM-770C and the glossy feeling of the printed matter obtained by each ink set was visually observed. The evaluation was made in accordance with the criteria shown below. Printing was carried out using the above-described evaluation papers (Glazed papers 1 to 3: sold by Epson). The results are shown in Table 13.

"Evaluation Criteria"

A: Gloss is uniform and gives no anxiety.
B: Gloss is somewhat ununiform.
C: Gloss is ununiform and gives anxiety as image.

TABLE 13

| | Color Developing Property | | | | Fixing Property | | | Uneven Gloss | | |
|---|---|---|---|---|---|---|---|---|---|---|
| | | | | | Evaluation Paper | | | | | |
| | P.5 | P.6 | P.7 | P.8 | GP.1 | GP.2 | GP.3 | GP.1 | GP.2 | GP.3 |
| Example 4 | B | B | A | A | A | A | A | A | A | A |
| Example 5 | B | B | A | A | A | A | A | A | A | A |
| Example 6 | B | B | A | A | A | A | A | A | A | A |
| Comparative Example 2 | D | D | B | C | B | C | B | C | C | B |

P.5 to P.8: Paper 5 to Paper 8
GP.1 to GP.3: Glazed paper 1 to Glazed paper 3

(Preparation of the Ink of Example 7 of the Invention)

The ink having the composition shown in Table 14 was prepared by the following procedure as in the cases of preparing the inks of above-described Examples 1 to 3.

An aqueous medium not including the colorant obtained as described above was previously prepared, and the aqueous medium was gradually added dropwise to the dispersion of the colorant described above in a stirred state, followed by sufficient stirring. The mixture was filtered by a membrane filter of 5 μm to obtain the ink.

The surface tension of each ink was measured by an automatic tensiometer, Type CBVP-Z, manufactured by Kyowa Kaimen Kagaku K. K. The results are shown in Table 14.

In Table 14 below, Olfin E1010 (manufactured by Nisshin Kagaku Kogyo K. K.), Olfin STG (manufactured by Nisshin Kagaku Kogyo K. K.), and Surfynol 465 (manufactured by Air Products and Chemicals Inc.) are acetylene glycol-based surface active agents, and Surfynol 61 (manufactured by Air Products and Chemicals Inc.) is an acetylene alcohol-based surface active agent. Also, DEGmBE is diethylene glycol monobutyl ether and TEGmBE is triethylene glycol monobutyl ether. In addition, in the table, Bk represents black, Y: yellow, M: magenta, LM: light magenta. C: cyan, and LC: light cyan.

(Ink Set of Example 7)

The ink set of Example 7 comprises a combination of "Bk, Y, M, LM, C and LC" as shown in Table 14 below.

TABLE 14

| | | Example 7 | | | | | |
|---|---|---|---|---|---|---|---|
| | | Bk | Y | M | LM | C | LC |
| Colorant | Colorant 4-A | 7.5 | — | — | — | — | — |
| | Colorant 4-B | — | 5.0 | — | — | — | — |
| | Colorant 4-C | — | — | 5.5 | 1.5 | — | — |
| | Colorant 4-D | — | — | — | — | 4.5 | 1.0 |
| Alkylene glycol-based surfactant | Olfin E1010 | 1.00 | — | — | — | — | — |
| | Olfin STG | — | — | 1.00 | 1.00 | — | — |
| | Surfynol 465 | — | — | — | — | 1.20 | 1.20 |

TABLE 14-continued

| | | Example 7 | | | | | |
|---|---|---|---|---|---|---|---|
| | | Bk | Y | M | LM | C | LC |
| Acetylene alcohol surfactant | Surfynol 61 | — | 0.50 | — | — | — | — |
| Glycol Ethers | DEGmBE | 5.00 | — | — | — | — | — |
| | TEGmBE | — | 5.00 | — | — | 10.00 | 10.00 |
| 1,2-Alkylene glycol | 1,2-Pentanediol | — | 2.00 | — | — | — | — |
| | 1,2-Hexanediol | — | 3.00 | 5.00 | 5.00 | 3.00 | 3.00 |
| | 1,6-Hexanediol | — | — | 5.00 | 5.00 | — | — |
| Glycerol | Glycerol | 14.00 | 14.00 | 9.00 | 9.00 | 9.00 | 9.00 |
| | Diethylene glycol | — | — | 7.00 | 7.00 | 5.00 | 5.00 |
| | Thioglycol | — | — | 3.50 | 3.50 | — | — |
| | 1,3-dimethyl-2-imidazolidinone | — | 2.00 | — | — | — | — |
| pH Controller | Triethanolamine | 0.80 | 0.70 | 1.00 | 1.00 | 0.90 | 0.90 |
| | Potassium hydroxide | — | — | 0.10 | 0.10 | — | — |
| Antifungal Agent | Proxel XL-2 | 0.03 | 0.03 | 0.03 | 0.03 | 0.03 | 0.03 |
| Rust inhibitor | Benzotriazole | 0.02 | 0.02 | 0.02 | 0.02 | 0.02 | 0.02 |
| Water | Ion exchanged water | bal. | bal. | bal. | bal. | bal. | bal. |
| Surface tension (mN/m) | | 34 | 34 | 34 | 34 | 32 | 32 |

(Evaluation of Ink)

<Evaluation 13: Printing Quality>

With respect to each ink (the inks of Example 7) of above-shown Table 7, using the ink jet printer, MJ-930C (manufactured by Seiko Epson Corporation), each 24 letters of upper case letters and lower case letters of the alphabet were printed on each of the papers shown below. The letters printed were visually observed, and evaluated in accordance with the following criteria.

SA: No blurring generates in the whole paper and the printing density is high.

AA: Blurring is not generated but the printing density is low as compared with the SA lank.

A: Generation of blurring is slightly only observed on 2 or 3 papers.

B: Generation of blurring is slightly observed in all the papers.

C: Generation of blurring is many in all the papers.

The papers used for the evaluation are 12 kinds of papers including a Conqueror paper, a Favorit paper, a Modo paper, a Rapid Copy paper, an Epson EPP paper, a Xerox P paper, a Xerox 4024 paper. a Xerox 10 paper, a Neenha Bond paper, a Ricopy 6200 paper, a golden-banded lily paper (recycled paper), and a Xerox R paper (recycled paper).

<Evaluation 14: Water Resistance>

To the printed portion of each of the printed matters obtained in the printing quality test of Evaluation 13 was added dropwise 1 ml of ion exchanged water. The state thereof after 20 minutes was visually observed, and the water resistance was evaluated in accordance with the following criteria.

A: No change in all the papers.

B: The coloring material slightly flows out from the printed portion but the letter can be recognized.

C: The coloring material flows out from the printed portion and since the outline of the printed letter is obscure, the recognition of the letter is difficult.

<Evaluation 15: Dispersion Stability (1)>

Each ink was placed in a glass-made sample bottle (50 ml) followed by tightly sealing, and the bottle was allowed to stand for 2 weeks at 60° C. Before and after allowing stand the bottle, the viscosity of the ink was measured. The measurement was carried out using Rheometrix Scientific RFS2 under the conditions of 20° C. and 150 S⁻¹. The result obtained was evaluated by the following criteria.

SA: The variation is less than ±0.02 mPa·s
AA: The variation is at leas ±0.02 and less than ±0.05 Pa·s
A: The variation is at least ±0.05 and less than ±0.1 Pa·s
B: The variation is at least ±0.1 and less than ±0.3 Pa·s
C: The variation is at least ±0.3 mPa·s <Evaluation 16: Dispersion Stability (2)>

Each ink was placed in a glass-made sample bottle (50 ml) followed by tightly sealing, the bottle was allowed to stand for 2 weeks at 60° C. Existence of the generations of precipitates and foreign matters were determined, and the dispersion stability was evaluated in accordance with the following criteria.

A: No generations of precipitates and foreign matters.
B: Precipitates or foreign matters are generated.

<Evaluation 17: Reliability of Clogging>

Each ink was packed in each head of an ink jet printer, MJ-930C, manufactured by Seiko Epson Corporation and letters were continuously printed for 10 minutes. Thereafter, the printer was stopped and was allowed to stand for 2 weeks under the environment of 40° C. and a humidity of 25% without applying caps. After allowing to sand, letters were printed again, the number (the number of returning actions) required for obtaining the same printing quality as that before allowing to stand was determined, and the evaluation was carried out by the following criteria.

SA: By the returning action of from 0 to 1, the same printing quality as that before allowing stand was obtained.
AA: By the returning actions of from 2 to 3, the same printing quality as that before allowing stand was obtained.
A: By the returning actions of from 3 to 4, the same printing quality as that before allowing stand was obtained.
B: By the returning actions of from 5 to 6, the same printing quality as that before allowing stand was obtained.
C: Even by the returning actions of 7 times, the same printing quality as that before allowing stand was not obtained.

<Evaluation 18: Ejection Stability>

With respect to each ink, using an ink jet printer, MJ-930C (manufactured by Seiko Epson Corporation), letters were continuously printed on Xerox P papers. The states of the prints such as dot deletion, the displacement of the ink-landing positions, etc., were visually observed, and the ejection stability was evaluated in accordance with the following criteria.

SA: Even by printing on at least 50,000 papers, dot deletion and displacement of the ink-landing positions do not occur.
AA: Within the number of printed papers of at least 10,000 and less than 50,000, dot deletion and displacement of the ink-landing positions occur.
A: Within the number of printed papers of at least 1000 and less than 10,000, dot deletion and displacement of the ink-landing positions occur.
B: Within the number of printed papers of at least 100 and less than 1000, the dot deletion and displacement of the ink-landing positions occur.
C: Within the number of printed papers of less than 100, dot deletion and displacement of the ink-landing positions occur.

<Evaluation 19: Scrubbing Resistance>

Using the ink jet printer, MJ-930C (manufactured by Seiko Epson Corporation), each ink was solid-color printed at 100% duty on the Super Fine exclusive glazed film (manufactured by Seiko Epson Corporation) in a region of 10 mm×10 mm. After allowing to stand for one hour at a temperature of 25° C., the above-described printed region was scrubbed using a yellow aqueous fluorescent pen, ZEBRA PEN 2 (registered trade mark) manufactured ZEBRA K. K., at a load of 500 g and at a speed of 10 mm/second. Existence of the generation of soils was observed. The results were evaluated in accordance with the following criteria.

A: No stain generates by scrubbing two times.
B: Stain is not generated by one scrubbing but stain generates by the second scrubbing.
C: Stain generates by one scrubbing.

<Evaluation 20: Quick Drying Property>

With respect to each ink, using the ink jet printer, MJ-930C (manufactured by Seiko Epson Corporation), a solid-color was printed at 100% duty on the Xerox P paper in a region of 10 mm×10 mm. After 10 seconds, a new Xerox P paper was placed on the printed portion, and a weight of 300 g was placed thereon, following by standing for 10 seconds. The weight was then removed, and the ink adhesion state on the new P paper was confirmed. The results were evaluated in accordance with the following criteria.

A: No ink adhesion.
B: Ink adhesion is observed.

The results of above-described evaluations 13 to 20 are shown in Table 15 below.

TABLE 15

|  | Example 7 |  |  |  |  |  |
| --- | --- | --- | --- | --- | --- | --- |
|  | Bk | Y | M | LM | C | LC |
| Evaluation 13: Printing quality | SA | SA | SA | — | SA | — |
| Evaluation 14: Water resistance | A | A | A | A | A | A |
| Evaluation 15: Dispersion stability (1) | SA | SA | SA | SA | SA | SA |
| Evaluation 16: Dispersion stability (2) | A | A | A | A | A | A |
| Evaluation 17: Clogging reliability | AA | AA | AA | AA | AA | AA |
| Evaluation 18: Ejection stability | SA | SA | SA | SA | SA | SA |
| Evaluation 19: Scrubbing resistance | A | A | A | A | A | A |
| Evaluation 20: Quick drying property | A | A | A | A | A | A |

<Evaluation 21: Color Developing Property> <Evaluation 22: Fixing Property> <Evaluation 23: Uniformity of Gloss (Gloss Unevenness) of Gradation Print>

With respect to the ink of Example 7, the evaluations of the "Evaluation 21: Color developing property", "Evaluation 22: Fixing property" and "Evaluation 23: Uniformity of gloss (gloss unevenness) of gradation print" were carried out under the same conditions of "Evaluations 10 to 12" described above. The results are shown in Table 16.

TABLE 16

| Color Developing Property |  |  |  | Fixing Property |  |  | Uneven Gloss |  |  |
| --- | --- | --- | --- | --- | --- | --- | --- | --- | --- |
| Evaluation Paper |  |  |  |  |  |  |  |  |  |
| P.5 | P.6 | P.7 | P.8 | GP.1 | GP.2 | GP.3 | GP.1 | GP.2 | GP.3 |
| Example 7 B | B | A | A | A | A | A | A | A | A |

P.5 to P.8: Paper 5 to Paper 8
GP.1 to GP.3: Glazed paper 1 to Glazed paper 3

As is clear from each table described above, it can be seen that according to Examples 1 to 7 of the invention, printed images of high quality are obtained on evaluation papers and images of high quality having a high printing density and being excellent in the color developing property can be obtained. Also, it can be seen that Examples 4 to 6 are excellent in, for example, the color developing property as compared to Example 7.

<Industrial Applicability>

By the ink jet recording ink set of the invention, printed images of high quality are obtained with respect to recording media of ink jet recording exclusive papers such as plain papers, coated papers, etc., images of high quality having a high printing density and being excellent in the color developing property can be obtained, and the ink jet recording ink set of the invention gives excellent working effects in dispersion stability, ejection stability, and storage stability.

What is claimed is:

1. An ink jet recording ink set comprising a plurality of inks, each ink comprising at least a colorant encapsulating a pigment with a polymer, a penetrating agent comprising a surface active agent selected from the group consisting of an acetylene glycol-based surface active agent and an acetylene alcohol-based surface active agent, and water, wherein said ink set comprises a combination of black, yellow, magenta, and cyan inks, and wherein the polymer in each of the black, yellow, magenta and cyan inks is a polymer of a polymerizable surface active agent and a monomer.

2. The ink jet recording ink set according to claim 1, wherein the black, yellow, magenta, and cyan inks comprise a combination of at least one kind of a black ink, at least one kind of yellow ink, at least one kind of magenta ink, and at least one kind of a cyan ink, respectively.

3. The ink jet recording ink set according to claim 1 wherein the black, yellow, magenta, and cyan inks comprise a combination of at least one kind of a black ink having a first pigment concentration, at least one kind of a yellow ink having a second pigment concentration, at least one kind of a magenta ink having a third pigment concentration, and at least one kind of a cyan ink having a fourth pigment concentration, each of said first, second, third and fourth pigment concentrations being different.

4. The ink jet recording ink set according to claim 1, wherein the black ink comprises C.I. Pigment Black 7; the yellow ink comprises one kind or two or more kinds of pigments selected from the group consisting of C.I. Pigment Yellow 55, 74, 110, 128, 150, 155 and 180; the magenta ink comprises one kind or two or more kinds of pigments selected from the group consisting of C.I. Pigment Red 122, 202, and 209: and the cyan ink comprises one kind or two or more kinds of pigments selected from the group consisting of C.I. Pigment Blue 15, 15:1, 15:2, 15:3, 15:4, 15:6 and 16.

5. The ink jet recording ink set according to claim 1, wherein the colorant in each ink is present in an amount from 0.5 to 30% by weight.

6. The ink jet recording ink set according to claim 1, wherein the polymer in each ink comprises, as a main component, a polymer selected from the group consisting of a polyacrylic acid ester, a styrene-acrylic acid ester copolymer, a polystyrene, a polyester, a polyamide, a polyimide, a silicon-containing polymer, and a sulfur-containing polymer.

7. The ink jet recording ink set according to claim 6, wherein the polymer is a polymer having a crosslinked structure.

8. The ink jet recording ink set according to claim 7, wherein the polymer having a crosslinked structure is a polymer of a dispersing agent having a polymerizable group and a crosslinkable monomer.

9. The ink jet recording ink set according to claim 7, wherein the colorant is obtained by dispersing the pigment or the dye or both in water with a dispersing agent having a polymerizable group, and then adding at least a crosslinkable monomer and a polymerization initiator to cause polymerization.

10. The ink jet recording ink set according to claim 1, wherein the polymerizable surface active agent has a polymerizable group, a hydrophobic group, and a hydrophilic group in its structure.

11. The ink jet recording ink set according to claim 10, wherein the polymerizable group is selected from the group consisting of a vinyl group, an acrylic group, an acryloyl group, and a methacryloyl group.

12. The ink jet recording ink set according to claim 10, wherein the hydrophilic group is selected from the group consisting of a carbonyl group, a carboxyl group, a hydroxyl group, a sulfonic acid group, and salts thereof.

13. The ink jet recording ink set according to claim 1, wherein each ink of the ink jet recording ink set further contains glycerol and the surface active agent is present in each ink in an amount sufficient to make the surface tension of each ink 40 mN/m or lower.

14. The ink jet recording ink set according to claim 1, wherein the penetrating agent further comprises at least one member selected from a glycol ether and a 1,2-alkylene glycol.

15. The ink jet recording ink set according to claim 14, wherein the penetrating agent comprises (a) 2,4-dimethyl-5-hexyne-3-ol,2,4,7,9-tetramethyl-5-decyne-4,7-diol, 3,6-dimethyl-4-octyne-3,6-diol or (b) 2,4-dimethyl-5-hexyne-3ol, 2,4,7,9-tetramethyl-5-decyne-4,7-diol, 3,6-dimethyl-4-octyne-3,6-diol, having added with at most 30, on average, ethyleneoxy groups or propyleneoxy groups or (c) both.

16. The ink jet recording ink set according to claim 14, wherein the glycol ether is one member or a mixture or two or more members selected from the group consisting of diethylene glycol mono alkyl ether wherein the alkyl has 4 to 8 carbon atoms, triethylene glycol mono alkyl ether wherein the alkyl has 3 to 6 carbon atoms, and dipropylene glycol mono alkyl ether wherein the alkyl has 3 to 6 carbon atoms.

17. The ink jet recording ink set according to claim 16, comprising the 1,2-alkylene glycol, wherein the 1,2-alkylene glycol is a 1,2-alkyl diol with the alkyl having from 4 to 10 carbon atoms.

18. The ink jet recording ink set according to claim 16, comprising propylene glycol monobutyl ether or dipropylene glycol monobutyl ether or both.

19. The ink jet recording ink set according to claim 14, wherein the 1,2-alkylene glycol is 1,2-pentanediol or 1,2-hexanediol or both.

20. The ink jet recording ink set according to claim 1, wherein the penetrating agent further comprises 1,2-alkylene glycol.

21. The ink jet recording ink set according to claim 1, wherein the pigment for the colorant of each ink is encapsulated with the polymer by a process comprising the steps of (a) mixing an organic solvent phase comprising a polymerizable group, a hydrophobic group, a crosslinking agent, an organic solvent and a neutralizing agent with water in the presence of the pigment to form an emulsion, and (b) initiating a crosslinking reaction to form the polymer encapsulating the pigment and distilling off the organic solvent.

22. An ink jet recording ink set comprising a plurality of inks, each ink comprising at least a colorant encapsulating a pigment with a polymer, a penetrating agent comprising a surface active agent selected from the group consisting of an acetylene glycol-based surface active agent and an acetylene alcohol-based surface active agent, and water, wherein said ink set comprises a combination of black, yellow, magenta, cyan, orange and green inks, and wherein the polymer in each of the black, yellow, magenta, cyan, orange and green inks is a polymer of a polymerizable surface active agent and a monomer.

23. The ink jet recording ink set according to claim 22, wherein the black ink comprises C.I. Pigment Black 7; the yellow ink comprises one kind or two or more kinds of pigments selected from the group consisting of C.I. Pigment Yellow 55, 74, 110, 128, 150, 155 and 180; the magenta ink comprises one kind or two or more kinds of pigments selected from the group consisting of C.I. Pigment Red 122, 202 and 209: the cyan ink comprises one kind or two or more kinds of pigments selected from the group consisting of C.I. Pigment Blue 15, 15:1, 15:2, 15:3, 15:4, 15:6 and 16; the orange ink comprises one kind or two or more kinds of pigments selected from the group consisting of C.I. Pigment Orange 36 and 43; and the green ink comprises one kind or two or more kinds of pigments selected from the group consisting of C.I. Pigment Green 7 and 36.

24. The ink jet recording ink set according to claim 22, wherein the penetrating agent further comprises at least one member selected from a glycol ether and a 1,2-alkylene glycol.

25. The ink jet recording ink set according to claim 22, wherein the colorant in each ink is present in an amount from 0.5 to 30% by weight.

26. The ink jet recording ink set according to claim 22, wherein the polymer in each ink comprises, as a main component, a polymer selected from the group consisting of a polyacrylic acid ester, a styrene-acrylic acid ester copolymer, a polystyrene, a polyester, a polyamide, a silicon-containing polymer, and a sulfur-containing polymer.

27. The ink jet recording ink set according to claim 22, wherein the polymer in each ink is a polymer of a polymerizable surface active agent and a monomer.

28. The ink jet recording ink set according to claim 22, wherein each ink of the ink jet recording ink set further contains glycerol and the surface active agent is present in each ink in an amount sufficient to make the surface tension of each ink 40 m/N/m or lower.

29. The ink jet recording ink set according to claim 22, wherein the penetrating agent further comprises 1,2-alkylene glycol.

* * * * *